(12) United States Patent
Kusaka

(10) Patent No.: US 8,269,880 B2
(45) Date of Patent: Sep. 18, 2012

(54) IMAGING DEVICE, CAMERA AND IMAGE PROCESSING METHOD

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 862 days.

(21) Appl. No.: 11/704,200

(22) Filed: Feb. 9, 2007

(65) Prior Publication Data

US 2007/0237429 A1    Oct. 11, 2007

(30) Foreign Application Priority Data

Apr. 11, 2006  (JP) ................................. 2006-108956

(51) Int. Cl.
*H04N 5/232*    (2006.01)
*G03B 13/00*    (2006.01)

(52) U.S. Cl. ...................................................... 348/350

(58) Field of Classification Search .................. 348/246, 348/315, 317, 320, 322, 340, 345–356; 396/121; 250/204; 382/272

See application file for complete search history.

(56) References Cited

U.S. PATENT DOCUMENTS

| | | | | |
|---|---|---|---|---|
| 5,327,192 A * | 7/1994 | Sensui | ........................... | 396/114 |
| 5,758,210 A * | 5/1998 | Hamada et al. | ............... | 396/121 |
| 6,642,960 B1 | 11/2003 | Kohashi et al. | | |
| 6,781,632 B1 | 8/2004 | Ide | | |
| 6,791,608 B1 | 9/2004 | Miyazawa | | |
| 6,819,360 B1 * | 11/2004 | Ide et al. | ....................... | 348/340 |
| 6,956,611 B2 * | 10/2005 | Omura | ........................... | 348/345 |
| 7,154,547 B2 * | 12/2006 | Oda | ............................... | 348/277 |
| 7,200,280 B2 | 4/2007 | Enomoto | | |
| 7,474,352 B2 * | 1/2009 | Oikawa | ........................... | 348/349 |
| 2002/0158977 A1 * | 10/2002 | Hamilton, Jr. | ................ | 348/246 |
| 2003/0072501 A1 | 4/2003 | Enomoto | | |

FOREIGN PATENT DOCUMENTS

| | | |
|---|---|---|
| JP | A-10-51693 | 2/1998 |
| JP | A-11-191866 | 7/1999 |
| JP | A-11-220661 | 8/1999 |
| JP | A 2000-305010 | 11/2000 |
| JP | A-2000-312314 | 11/2000 |
| JP | A-2001-16599 | 1/2001 |
| JP | A-2003-179750 | 6/2003 |
| JP | A-2004-109863 | 4/2004 |
| JP | A-2004-112275 | 4/2004 |
| JP | A-2005-175547 | 6/2005 |

OTHER PUBLICATIONS

Jun. 7, 2011 Office Action issued in Japanese Patent Application No. 2006-108956 (with translation).

\* cited by examiner

*Primary Examiner* — Albert Cutler

(74) *Attorney, Agent, or Firm* — Oliff & Berridge, PLC

(57) ABSTRACT

An imaging device includes an image sensor equipped with imaging pixels disposed in a two-dimensional array and focus detection pixels disposed along a specific direction over part of the array of the imaging pixels. The imaging device categorizes an image pattern indicating a pixel output change along a direction perpendicular to the direction in which the focus detection pixels are disposed based upon the outputs from the imaging pixels present around each focus detection pixel. Then, it determines an image output at the focus detection pixel based upon the output from the focus detection pixel and the outputs from the imaging pixels present around the focus detection pixel through an arithmetic operation method corresponding to the categorized image pattern.

16 Claims, 25 Drawing Sheets

FIG.19

| B1 | G1 | B2 | G2 | B3 |
|----|----|----|----|----|
| G3 | R1 | G4 | R2 | G5 |
| AF1 | AF2 | AF3 | AF4 | AF5 |
| G6 | R3 | G7 | R4 | G8 |
| B4 | G9 | B5 | G10 | B6 |

FIG.22

| B 1 | G 1 | B 2 | G 2 | B 3 |
|-----|-----|-----|-----|-----|
| G 3 | R 1 | G 4 | R 2 | G 5 |
| AF 1 | G 11 | AF 3 | G 12 | AF 5 |
| G 6 | R 3 | G 7 | R 4 | G 8 |
| B 4 | G 9 | B 5 | G 10 | B 6 |

16   10
    313

10   17
    314

IMAGING DEVICE, CAMERA AND IMAGE PROCESSING METHOD

INCORPORATION BY REFERENCE

The disclosure of the following priority application is herein incorporated by reference:
Japanese Patent Application No. 2006-108956 filed Apr. 11, 2006

BACKGROUND OF THE INVENTION

1. Field of the Invention

The present invention relates to an imaging device equipped with an image sensor that includes imaging pixels and focus detection pixels, a camera equipped with the imaging device and an image processing method adopted when processing an image captured with an image sensor.

2. Description of the Related Art

There is an imaging device-known in the related art equipped with an image sensor having imaging pixels and focus detection pixels disposed together on a single substrate, which captures an image formed on the image sensor and also detects the focus adjustment state of the image (see Japanese Laid Open Patent Publication No. 2000-305010).

In the imaging device in the related art described above, a virtual image at a given focus detection pixel is obtained by simply averaging the outputs from imaging pixels present around the focus detection pixels or by simply averaging the focus detection pixel output and the outputs from imaging pixels present around the focus detection pixel. This means that if an edge pattern image or a fine line pattern image is superimposed over the focus detection pixels, the virtual imaging pixel output obtained through the simple averaging deviates from the output of the imaging pixel that would otherwise occupy the focus detection pixel position. This, in turn, may lead to the occurrence of color artifacts, a false pattern or a loss of pattern, resulting in poor image quality.

SUMMARY OF THE INVENTION

According to the 1st aspect of the invention, an imaging device comprises an image sensor that includes imaging pixels disposed in a two-dimensional array and focus detection pixels disposed along a specific direction over part of the array of the imaging pixels, a recognizing circuit that recognizes an image pattern indicating a pixel output change along a direction perpendicular to the specific direction in which the focus detection pixels are disposed based upon outputs from the imaging pixels present around each focus detection pixel, and a determining circuit that determines an image output at the focus detection pixel based upon an output from the focus detection pixel and the outputs from the imaging pixels present around the focus detection pixel through an arithmetic operation method corresponding to the image pattern having been recognized by the recognizing circuit.

In the imaging device, the image sensor may include a plurality of pixel units disposed in a two-dimensional array, each equipped with a plurality of types of imaging pixels with different spectral sensitivity characteristics set regularly, and also includes focus detection pixels with sensitivity over a range encompassing all the spectral sensitivity characteristics of the pixel units, which are disposed within the array of the imaging pixels.

The pixel units may each include three different types of pixels disposed in a Bayer array with sensitivity to red, green and blue. In this case, the focus detection pixels may be disposed on the image sensor at positions equivalent to a horizontal row or a vertical row along which the imaging pixels sensitive to blue and green would otherwise be disposed in a straight line.

In the imaging device, the imaging pixels and the focus detection pixels may each include a micro-lens and a photoelectric conversion unit.

The focus detection pixels can detect a pair of images formed with a pair of light fluxes passing through a pair of areas at an exit pupil of the imaging optical system.

According to the 2nd aspect of the invention, an imaging device comprises an image sensor that includes imaging pixels and focus detection pixels, a recognizing circuit that recognizes an image superimposed over each focus detection pixel based upon outputs from the imaging pixels, and a determining circuit that determines an image output at the focus detection pixel based upon recognition results provided by the recognizing circuit and the outputs from the imaging pixels.

According to the 3rd aspect of the invention, an imaging device comprises an image sensor that includes an array of imaging pixels and focus detection pixels, a recognizing circuit that recognizes an image pattern indicating a pixel output change along a direction perpendicular to a direction in which the focus detection pixels are disposed based upon outputs from the imaging pixels, a first circuit that outputs an image at each focus detection pixel based upon the outputs from the imaging pixels, a second circuit that outputs an image at the focus detection pixel based upon a color structure of the outputs from the imaging pixels and an output from the focus detection pixel, and a determining circuit that determines an image output at the focus detection pixel based upon the image pattern having been recognized by the recognizing circuit and at least one of the image output from the first circuit and the image output from the second circuit.

In the imaging device according to the 3rd aspect of the invention, the determining circuit may determine the image output at the focus detection pixel by individually weighting the image output from the first circuit and the image output from the second circuit in correspondence to the image pattern having been recognized by the recognizing circuit.

According to the 4th aspect of the invention, an imaging device comprises an image sensor that includes an array of imaging pixels and focus detection pixels, a recognizing circuit that recognizes image uniformity along a direction perpendicular to a direction in which the focus detection pixels are disposed based upon outputs from the imaging pixels, and a determining circuit that determines an image output at each focus detection pixel based upon recognition results provided by the recognizing circuit and the outputs from the imaging pixels.

According to the 5th aspect of the invention, an imaging device comprises an image sensor that includes an array of imaging pixels and focus detection pixels, a detection circuit that detects a difference among image outputs along a direction perpendicular to a direction in which the focus detection pixels are disposed based upon outputs from the imaging pixels, and a determining circuit that determines an image output at each focus detection pixel based upon detection results provided by the detection circuit and the outputs from the imaging pixels.

According to the 6th aspect of the invention, an imaging device comprises an image sensor that includes an array of imaging pixels and focus detection pixels, a detection circuit that detects a difference among image outputs along a direction perpendicular to a direction in which the focus detection pixels are disposed based upon a difference between uniformity among outputs from the imaging pixels present on two sides of the array of the focus detection pixels and an average value of the outputs from the imaging pixels present on the two sides of the array of focus detection pixels, and a determining circuit that determines an image output at each focus detection pixel based upon detection results provided by the detection circuit and the outputs from the imaging pixels.

According to the 7th aspect of the invention, an imaging device comprises an image sensor that includes an array of imaging pixels and focus detection pixels, a detection circuit that detects a peak or a bottom among image outputs along a direction perpendicular to a direction in which the focus detection pixels are disposed based upon outputs from the imaging pixels, and a determining circuit that determines an image output at each focus detection pixel based upon detection results provided by the detection circuit and the outputs from the imaging pixels.

According to the 8th aspect of the invention, an imaging device comprises an image sensor that includes an array of imaging pixels and focus detection pixels, a detection circuit that detects a peak or a bottom among image outputs along a direction perpendicular to a direction in which the focus detection pixels are disposed based upon a difference between uniformity among outputs from the imaging pixels present on two sides of the array of the focus detection pixels and an average value of the outputs from the imaging pixels present on the two sides of the array of the focus detection pixels, and a determining circuit that determines an image output at each focus detection pixel based upon detection results provided by the detection circuit and the outputs from the imaging pixels.

A camera can be equipped with the imaging device.

According to the 9th aspect of the invention, a camera comprises an image sensor that includes imaging pixels and focus detection pixels, a recognizing circuit that recognizes an image superimposed over an array of focus detection pixels based upon outputs from the imaging pixels, and a determining circuit that determines an image output at each focus detection pixel based upon recognition results provided by the recognizing circuit and the outputs from the imaging pixels.

According to the 10th aspect of the invention, an image processing method comprises providing an image sensor that includes imaging pixels disposed in a two-dimensional array and focus detection pixels disposed along a specific direction over part of the array of the imaging pixels, recognizing an image pattern indicating a pixel output change along a direction perpendicular to the specific direction in which the focus detection pixels are disposed based upon outputs from the imaging pixels present around each focus detection pixel, and determining an image output at the focus detection pixel based upon an output from the focus detection pixel and the outputs from the imaging pixels present around the focus detection pixel through an arithmetic operation method corresponding to the recognized image pattern.

According to the 11th aspect of the invention, an image processing method comprises providing an image sensor that includes an array of imaging pixels and focus detection pixels, recognizing an image pattern indicating a pixel output change along a direction perpendicular to a direction in which the focus detection pixels are disposed based upon outputs from the imaging pixels, executing first processing to output an image at each focus detection pixel based upon the outputs from the imaging pixels, executing second processing to output an image at the focus detection pixel based upon a color structure of the outputs from the imaging pixels and an output from the focus detection pixel, and determining an image output at the focus detection pixel based upon the recognized image pattern and at least one of the image output through the first processing and the image output through the second processing.

According to the 12th aspect of the invention, an image processing method comprises providing an image sensor that includes imaging pixels and focus detection pixels, recognizing an image superimposed over each focus detection pixel based upon outputs from the imaging pixels, and determining an image output at the focus detection pixel based upon recognition results and the outputs from the imaging pixels.

BRIEF DESCRIPTION OF THE DRAWINGS

FIG. 19 is a partial enlargement of the image sensor, provided to facilitate the explanation of the interpolation processing;

FIG. 22 is a diagram provided to facilitate the explanation of the interpolation processing executed in the image sensor in a variation;

DETAILED DESCRIPTION OF THE PREFERRED EMBODIMENTS

Figure 1:
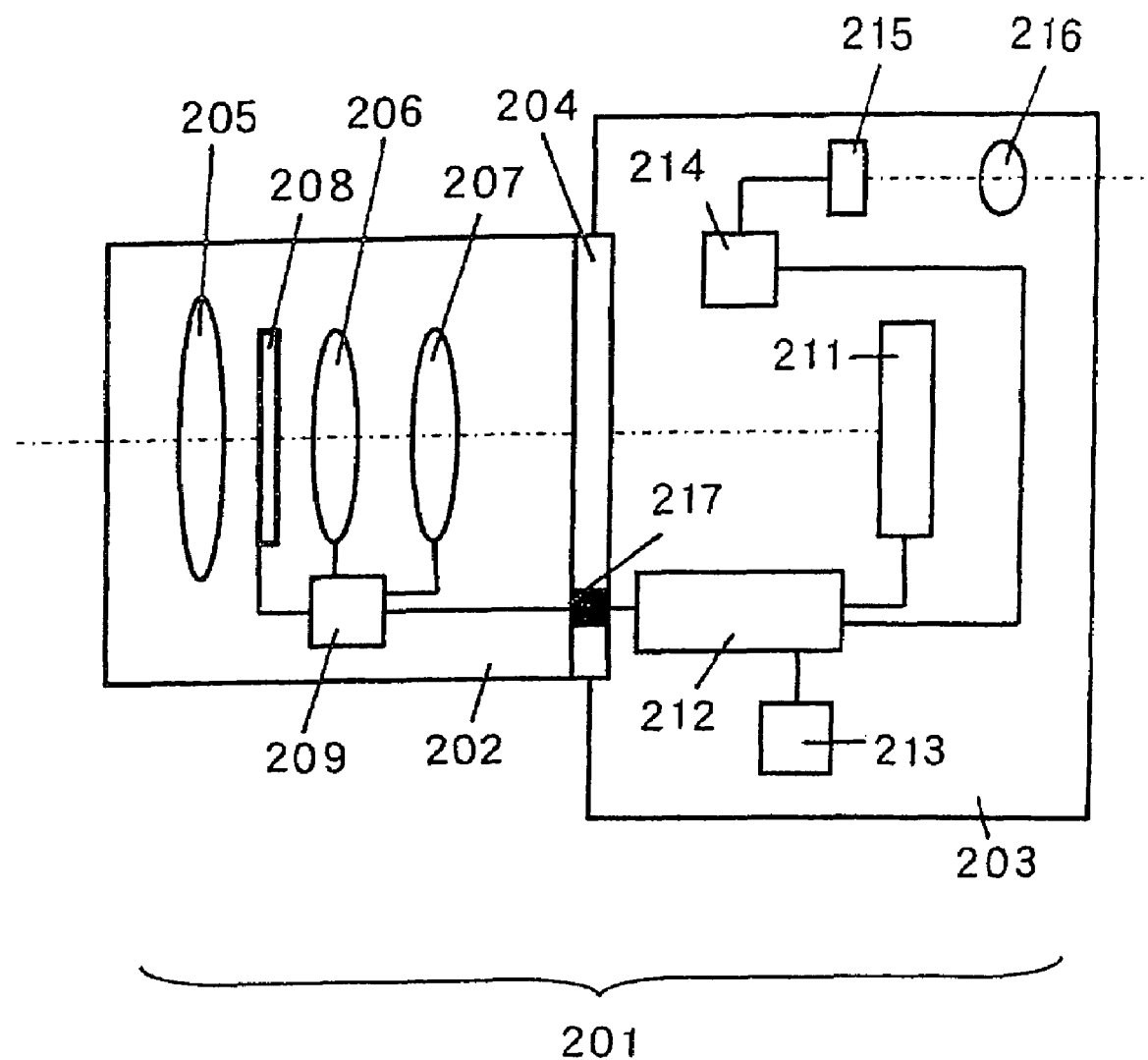
FIG. 1 shows the structure adopted in the digital still camera in an embodiment of the present invention.

An explanation is now given on an embodiment by adopting the present invention in a digital still camera as an imaging device. FIG. 1 shows the structure of the digital still camera in the embodiment. The digital still camera 201 in the embodiment comprises an exchangeable lens unit 202 and a camera body 203. The exchangeable lens unit 202 is mounted on a mount unit 204 at the camera body 203.

The exchangeable lens unit 202 includes lenses 205-207, an aperture 208 and a lens drive control device 209. It is to be noted that the lens 206 is a zooming lens and that the lens 207 is a focusing lens. The lens drive control device 209, constituted with a CPU and its peripheral components, controls the drive of the focusing lens 207 and the aperture 208, detects the positions of the zooming lens 206, the focusing lens 207 and the aperture 208 and transmits lens information and receives camera information by communicating with a control device in the camera body 203.

An image sensor 211, a camera drive control device 212, a memory card 213, an LCD driver 214, an LCD 215, an eyepiece lens 216 and the like are mounted at the camera body 203. The image sensor 211, set at the predetermined imaging plane (predetermined focal plane) of the exchangeable lens unit 202, captures a subject image formed through the exchangeable lens unit 202 and outputs image signals. At the image sensor 211, pixels used for imaging (hereafter simply referred to as imaging pixels) are disposed two-dimensionally, and rows of pixels used for focus detection (hereafter simply referred to as focus detection pixels), instead of imaging pixels, are disposed in the two-dimensional array over areas corresponding to focus detection positions.

The camera drive control device 212, constituted with a CPU and its peripheral components, controls the drive of the image sensor 211, processes the captured image, executes focus detection and focus adjustment for the exchangeable lens unit 202, controls the aperture 208, controls display operation at the LCD 215, communicates with the lens drive control device 209 and controls the overall operational sequence in the camera. It is to be noted that the camera drive control device 212 communicates with the lens drive control device 209 via an electrical contact point 217 at the mount unit 204.

The memory card 213 is an image storage device in which captured images are stored. The LCD 215 is used as a display unit of a liquid crystal viewfinder (EVF: electronic viewfinder). The photographer is able to visually check a captured image displayed at the LCD 215 via the eyepiece lens 216.

The subject image formed on the image sensor 211 after passing through the exchangeable lens unit 202 undergoes photoelectric conversion at the image sensor 211 and the post-photoelectric conversion output is provided to the camera drive control device 212. The camera drive control device 212 determines through arithmetic operation the defocus amount at a focus detection position based upon the outputs from the focus detection pixels and transmits the defocus amount to the lens drive control device 209. In addition, the camera drive control device 212 provides image signals generated based upon the outputs from the imaging pixels to the LCD driver 214 so as to display the captured image at the LCD 215 and also stores the image signals into the memory card 213.

The lens drive control device 209 detects the positions of the zooming lens 206, the focusing lens 207 and the aperture 208 and obtains through arithmetic operation the lens information based upon the detected positions. It is to be noted that the lens information corresponding to the detected positions may be selected from a lookup table prepared in advance. The lens information is then provided to the camera drive control device 212. In addition, the lens drive control-device 209 calculates a lens drive amount indicating the extent to which the lens is to be driven based upon the defocus amount received from the camera drive control device 212, and controls the drive of the focusing lens 207 based upon the lens drive amount.

Figure 2:
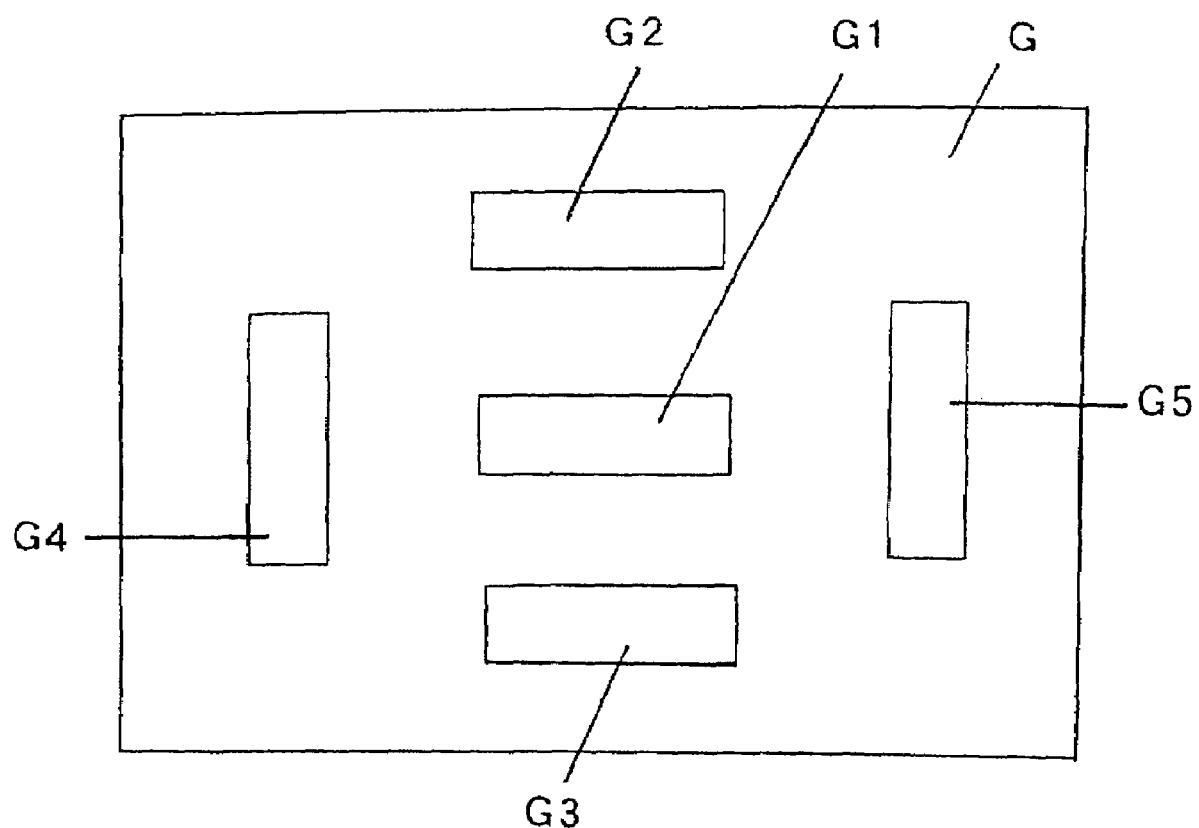
FIG. 2 shows the focus detection areas on the imaging plane set on the predetermined imaging plane of the exchangeable lens.

FIG. 2 shows focus detection areas on an imaging plane G set on the predetermined imaging plane of the exchangeable lens unit 202. Focus detection areas G1 to G5 are set on the imaging plane G and the focus detection pixels in the image sensor 211 are arrayed in a straight-line extending along the length of each of the focus detection areas G1 to G5. Namely, focus detection pixel rows on the image sensor 211 sample the image portions in the focus detection areas G1 to G5 within the subject image formed on the imaging image plane G. The photographer manually selects a given focus detection area among the focus detection areas G1 to G5 in correspondence to a specific photographic composition.

Figure 3:
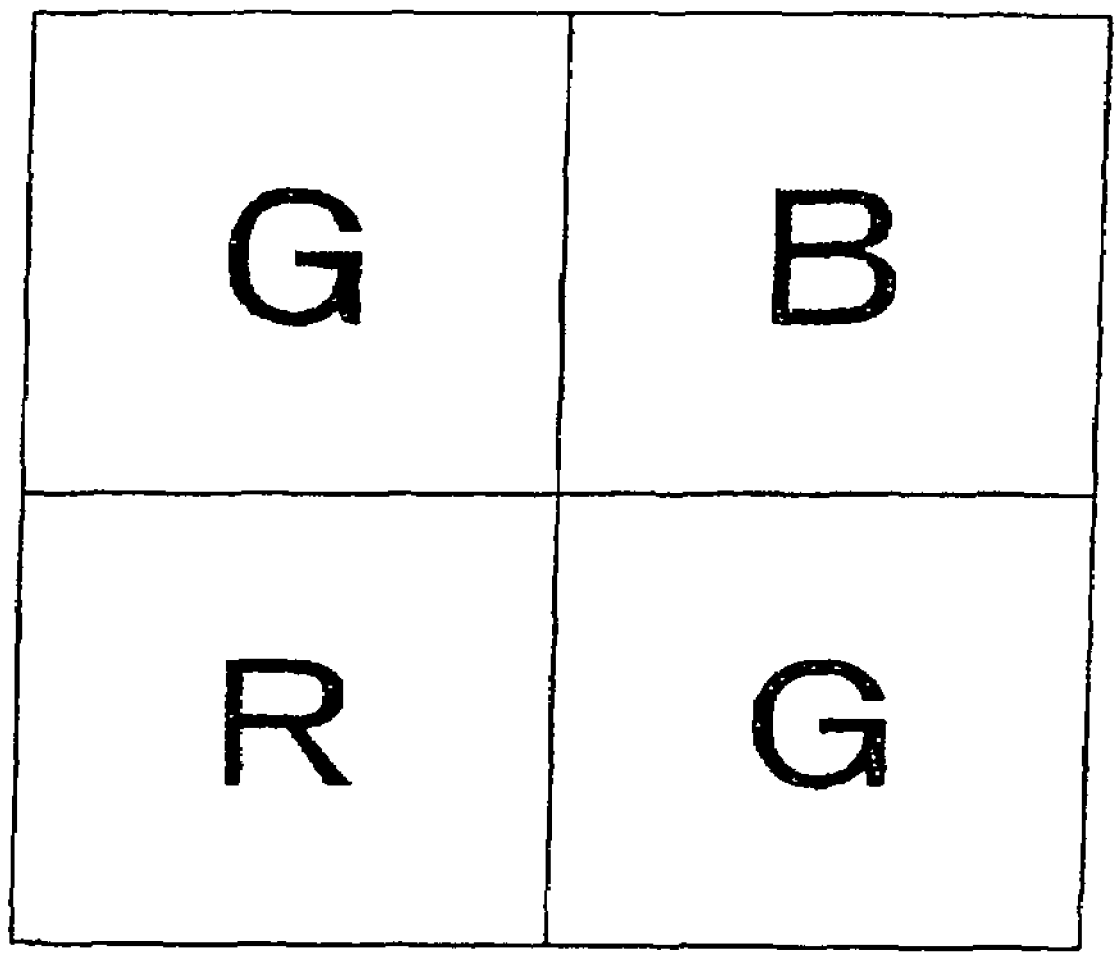
FIG. 3 shows a Bayer array in color filters.

FIG. 3 shows the positional arrangement adopted for color filters disposed at the image sensor 211. Color filters set in a Bayer array, as shown in FIG. 3, are each disposed at one of the imaging pixels arrayed two-dimensionally on the substrate of the image sensor 211.

It is to be noted that while FIG. 3 shows the color filter positional arrangement corresponding to a four-pixel imaging area, this imaging pixel unit adopting the color filter positional arrangement over the four-pixel (2×2) area is two-dimensionally reiterated. In the Bayer array, two pixels, each equipped with a G (green) filter, are disposed diagonally across from each other, and a pair of pixels, one equipped with a B (blue) filter and the other equipped with an R (red) filter, are disposed diagonally across from each other, perpendicular to the G filter pixels. In other words, the green pixels are disposed at higher density compared to the red pixels and the blue pixels in the Bayer array.

Figure 4:
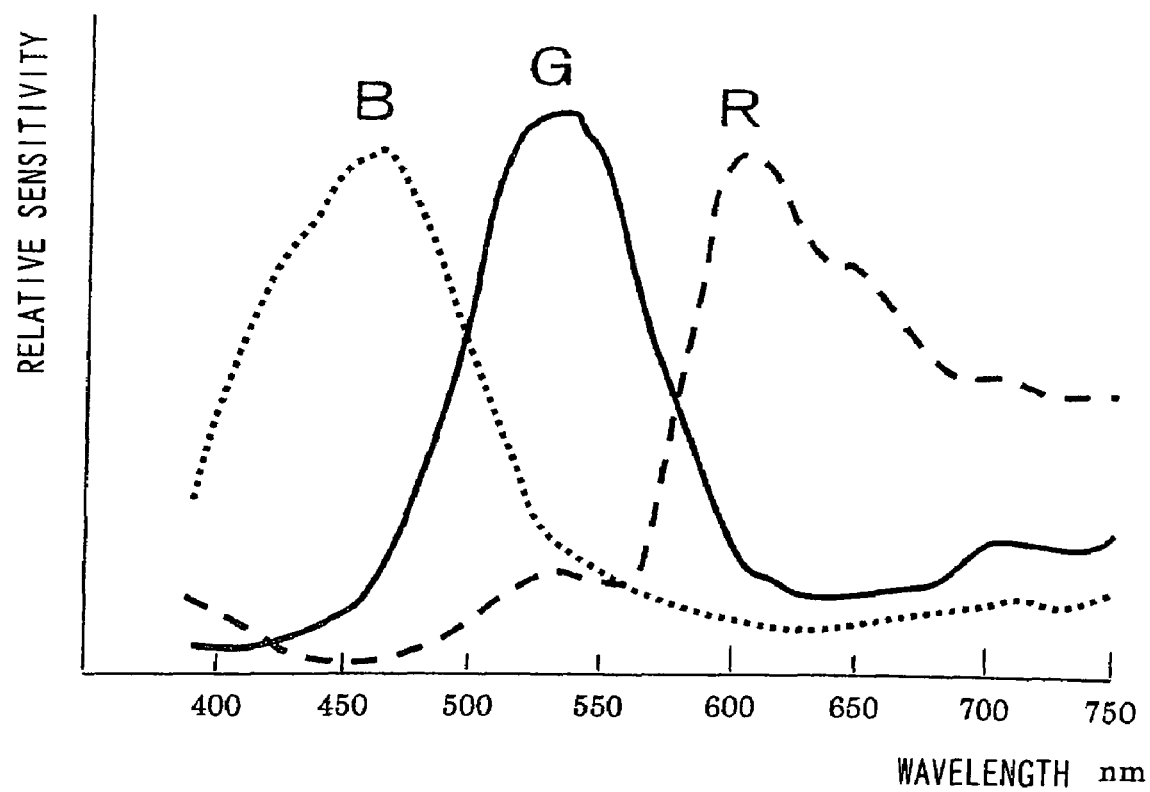
FIG. 4 shows the spectral characteristics of the individual color filters.
Figure 5:
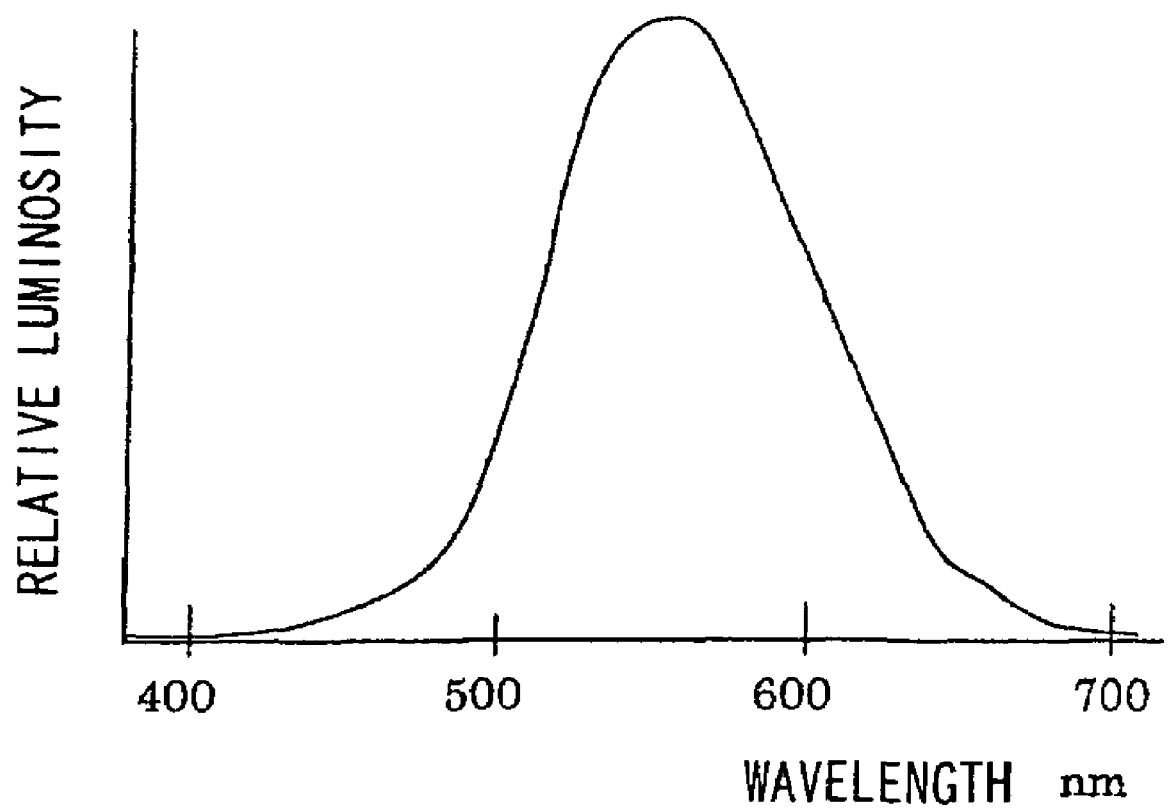
FIG. 5 shows the spectral characteristics of the green pixels.

The overall spectral characteristics of the green pixels, the red pixels and the blue pixels, integrating the spectral sensitivities of the color filters corresponding to the individual colors, the spectral sensitivity of the photodiodes engaged in photoelectric conversion and the spectral characteristics of infrared clipping filters (not shown), are indicated in the graph presented in FIG. 4. The green pixels, the red pixels and the blue pixels, at which color separation occurs, have sensitivity over different light wavelength ranges (different spectral sensitivity). The spectral characteristics of the green pixels indicate a sensitivity level close to the peak of the relative luminosity shown in FIG. 5.

Figure 6:
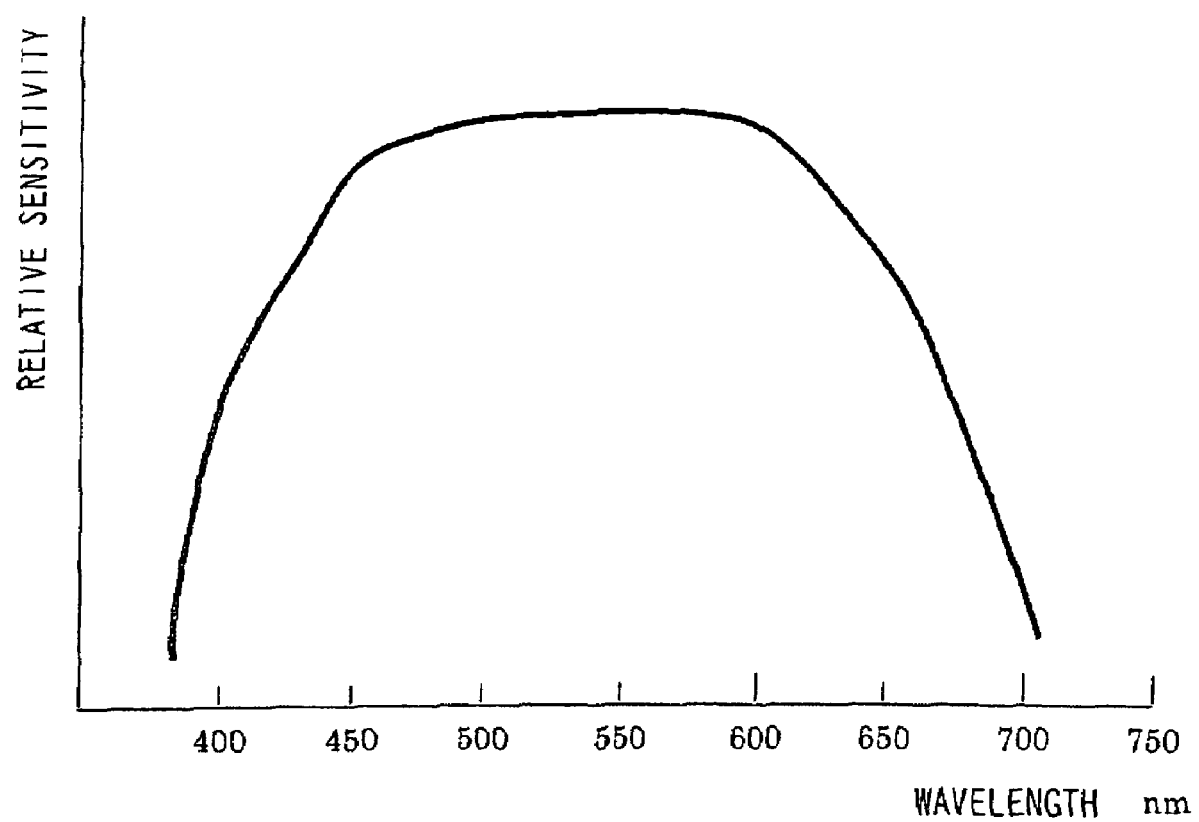
FIG. 6 shows the spectral characteristics of the focus detection pixels.

It is to be noted that in order to obtain a sufficient light amount, no color filters are disposed at the focus detection pixels and thus, the focus detection pixels have the spectral characteristics shown in FIG. 6. The spectral sensitivity of the photodiodes engaged in photoelectric conversion and the spectral characteristics of the infrared clipping filters (not shown) are integrated in the spectral characteristics shown in FIG. 6. Namely, the spectral characteristics in FIG. 6 are similar to the sum of spectral characteristics of the green pixels, the red pixels and the blue pixels shown in FIG. 4, which indicate sensitivity in a light wavelength range containing the wavelength ranges corresponding to all the pixels, i.e., the green pixels, the red pixels in the blue pixels.

Figure 7:
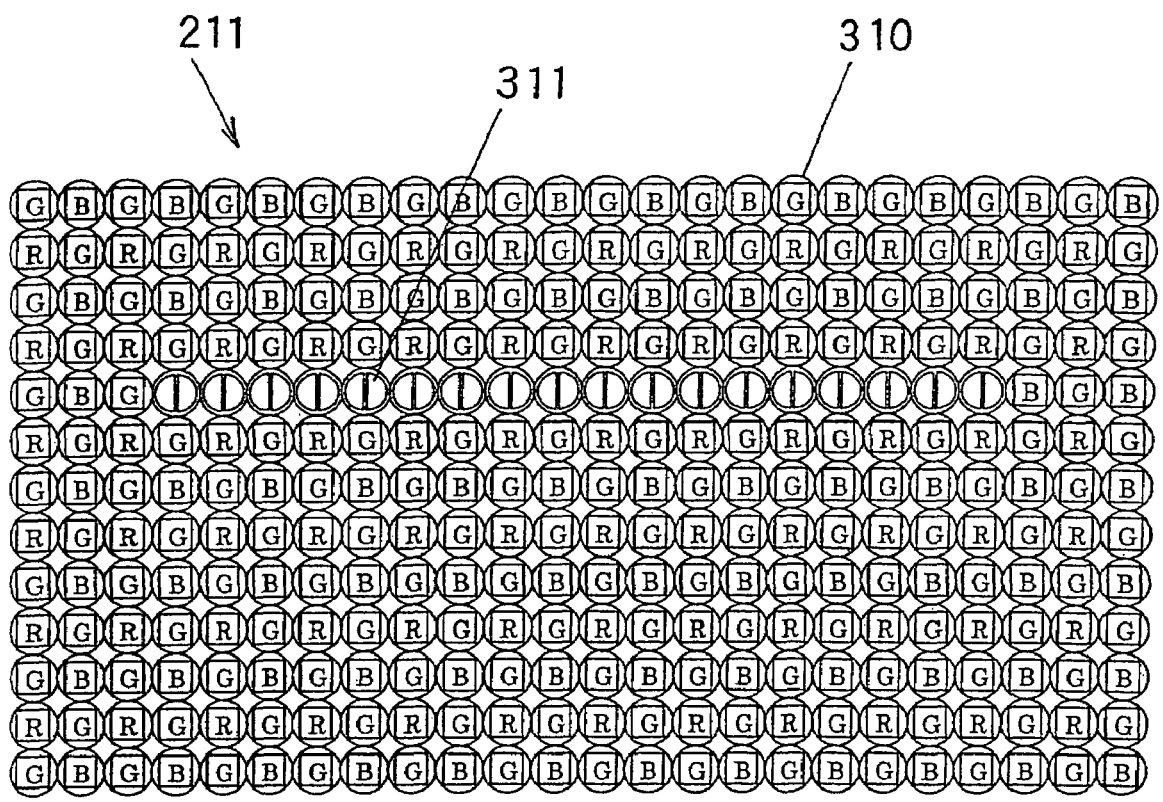
FIG. 7 shows in detail the structure of the image sensor.

FIG. 7 is a front view showing in detail the structure of the image sensor 211. It is to be noted that FIG. 7 shows part of the image sensor 211, near a given focus detection area set on the image sensor 211, in an enlargement. The image sensor 211 comprises imaging pixels 310 and focus detection pixels 311 used for focus detection.

Figure 8:
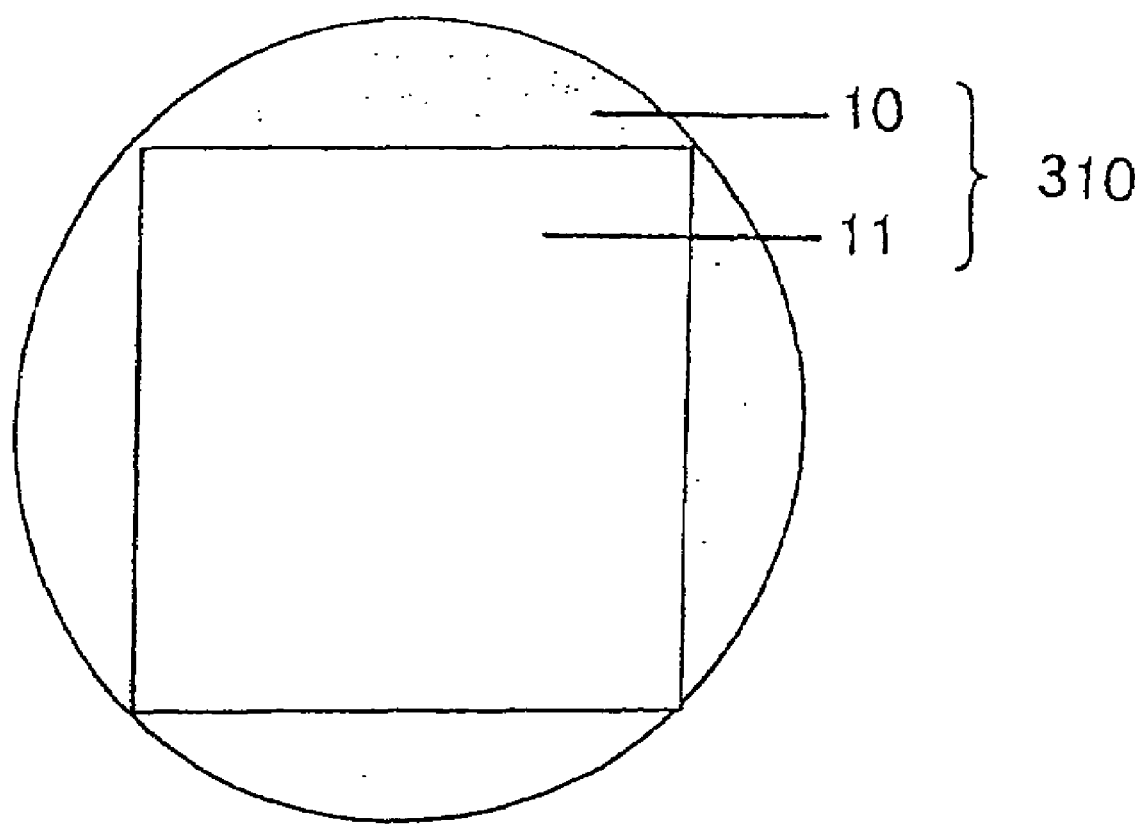
FIG. 8 shows the structure of the imaging pixels.
Figure 9:
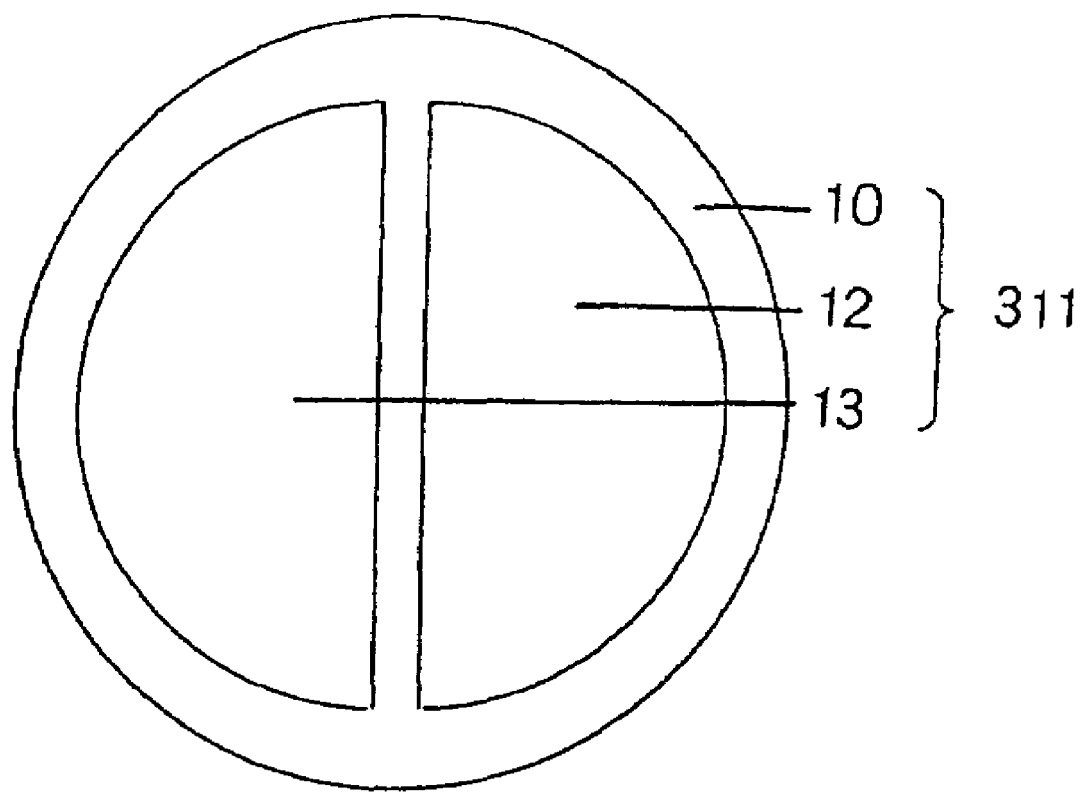
FIG. 9 shows the structure of the focus detection pixels.

As shown in FIG. 8, the imaging pixels each comprise a micro-lens 10, a photoelectric conversion unit 11 and a color filter (not shown). As shown in FIG. 9, the focus detection pixels 311 each comprise a micro-lens 10 and a pair of photoelectric conversion units 12 and 13. The photoelectric conversion unit 11 at each imaging pixel 310 is designed in a shape that allows the photoelectric conversion unit to receive all the light flux passing through the exit pupil of the exchangeable lens at a light setting (e.g., an exit pupil equivalent to F 1.0) via the micro-lens 10. In addition, the pair of photoelectric conversion units 12 and 13 at each focus detection pixel 311 are designed in a shape that allows the photoelectric conversion units to receive all the light flux passing through a specific exit pupil of the exchangeable lens (e.g., an exit pupil equivalent to F 2.8) via the micro-lens 10.

As shown in FIG. 7, color filters corresponding to R, G and B colors are disposed at two-dimensionally arrayed imaging pixels 310 so as to achieve an RGB Bayer array. The focus detection pixels 311 are densely disposed along a straight-line without allowing any interval at a horizontal (or vertical) row that would otherwise be occupied by imaging pixels 310 with B filters and G filters in each of the focus detection areas G1 to G5 shown in FIG. 2. The following advantage is achieved by disposing the focus detection pixels 311 along the horizontal (or vertical) row that would otherwise be occupied by imaging pixels 310 equipped with B filters and G filters. Namely, a slight error, occurring when generating pixel signals at positions occupied by the focus detection pixels 311 through pixel interpolation to be detailed later, can remain more or less unnoticeable to the human eye, since the human eye is more perceptive to red than to blue and the green pixels, disposed with higher density compared to the blue pixels and the red pixels, have a lower image defect contribution factor per pixel.

Figure 10:
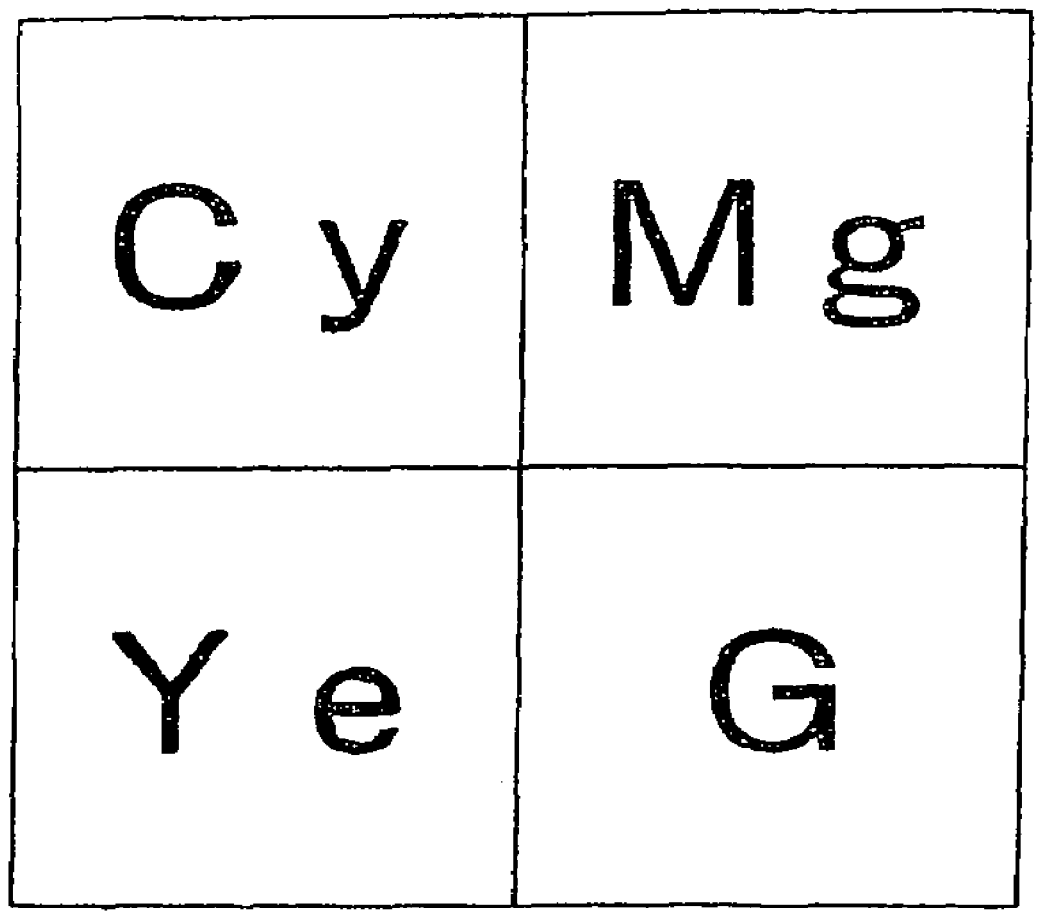
FIG. 10 shows an arrangement that may be adopted for complementary color filters.

It is to be noted that the color filters may be arranged in an array other than the Bayer array shown in FIG. 3. For instance, an imaging pixel unit that includes complementary color filters, i.e., a G (green) filter, a Ye (yellow) filter, an Mg (magenta) filter and a Cy (cyan) filter, as shown in FIG. 10, may be reiterated two-dimensionally. At an image sensor achieved by two-dimensionally reiterating the imaging pixel unit with these complementary color filters, the focus detection pixels 311 should be disposed at pixel positions that would otherwise be occupied by imaging pixels equipped with cyan filters and magenta filters, i.e., imaging pixels equipped with color filters that contain a blue component with which the output error is relatively unnoticeable.

Figure 11:
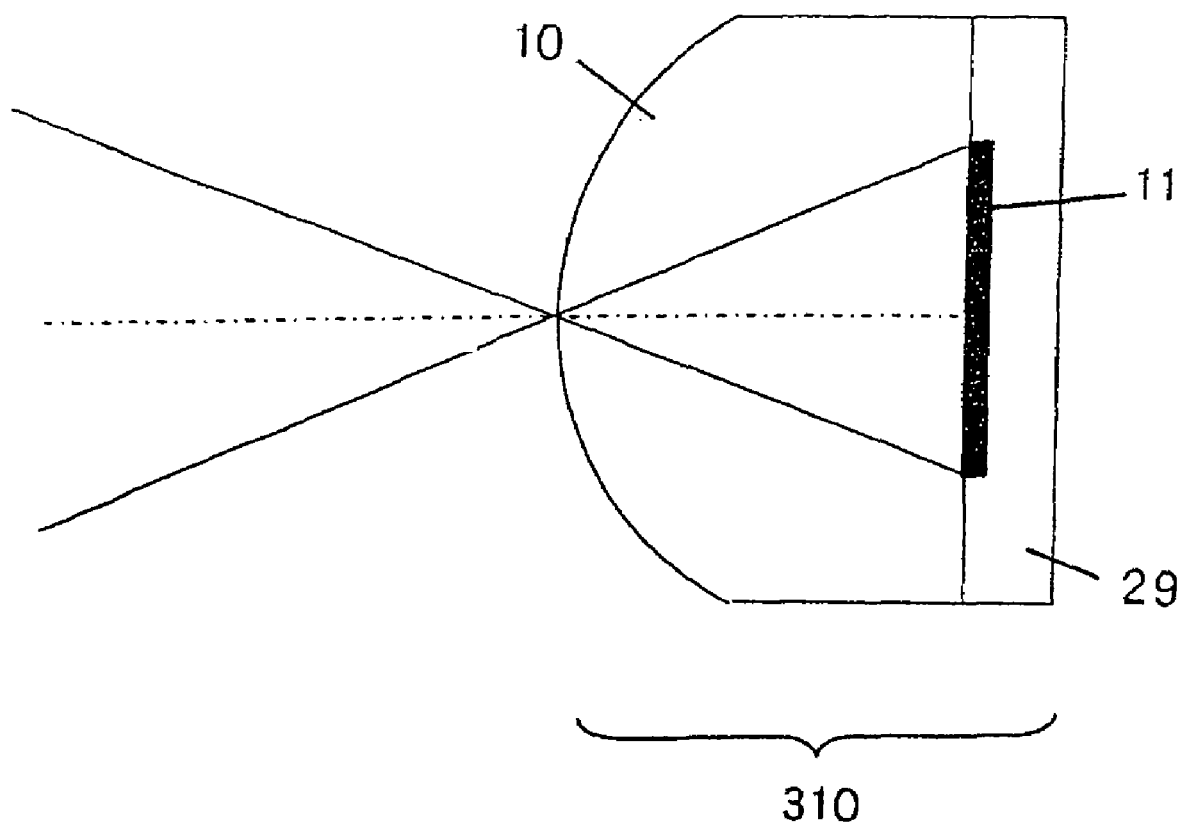
FIG. 11 is a sectional view of an imaging pixel.

FIG. 11 is a sectional view of an imaging pixel 310. The micro-lens 10 is set to the front of the imaging photoelectric conversion unit 11 at the imaging pixel 310 and, as a result, an image of the photoelectric conversion unit 11 is projected frontward via the micro-lens 10. The photoelectric conversion unit 11 is formed on a semiconductor circuit substrate 29, with a color filter (not shown) disposed between the micro-lens 10 and the photoelectric conversion unit 11.

Figure 12:
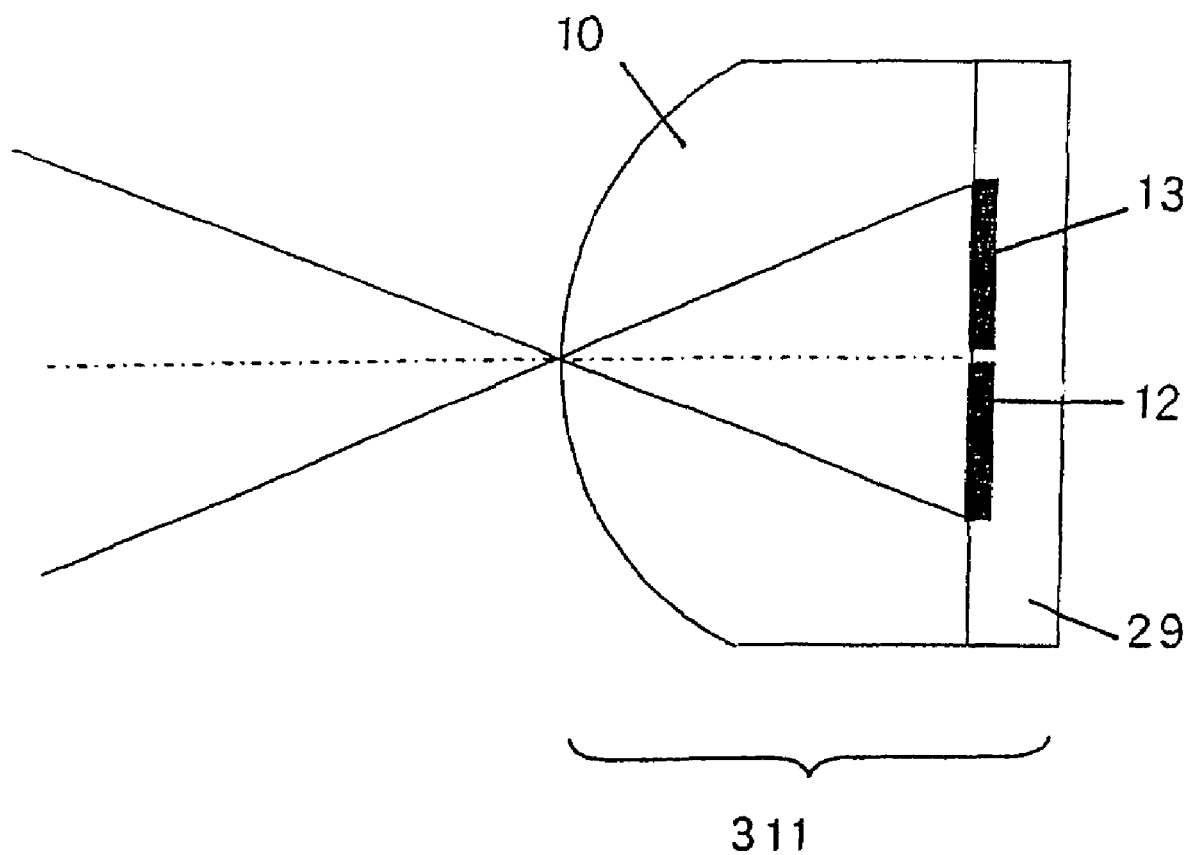
FIG. 12 is a sectional view of a focus detection pixel.

FIG. 12 is a sectional view of a focus detection pixel 311. In the focus detection pixel 311, the micro-lens 10 is disposed to the front of the photoelectric conversion units 12 and 13 used for focus detection and thus, images of the photoelectric conversion units 12 and 13 are projected frontward via the micro-lens 10. The photoelectric conversion units 12 and 13 are formed on the semiconductor circuit substrate 29.

Figure 13:
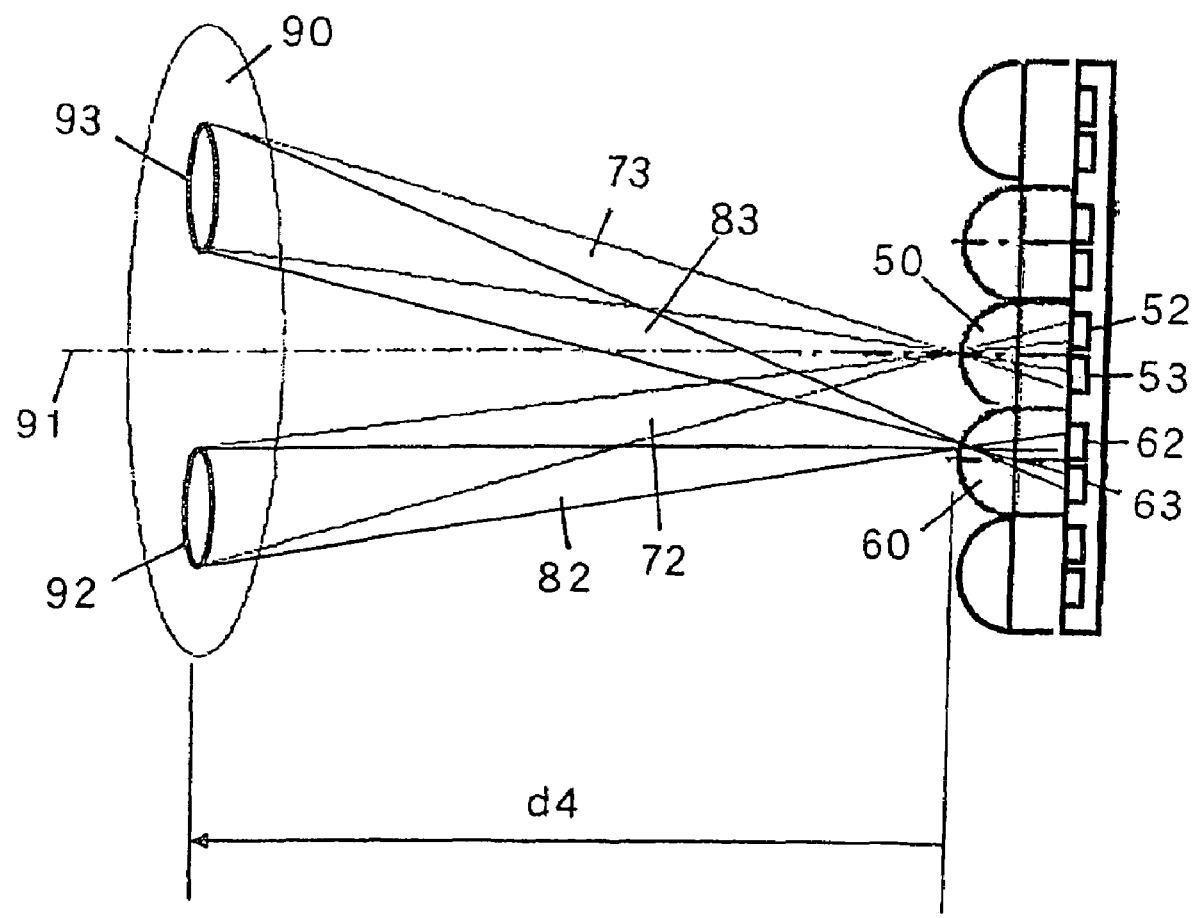
FIG. 13 illustrates focus detection executed through a pupil division-type method.

Next, in reference to FIG. 13, focus detection executed by adopting a pupil division-type method is explained. FIG. 13 shows a micro-lens 50, a pair of photoelectric conversion units 52 and 53, a micro-lens 60 and a pair of photoelectric conversion units 62 and 63. The micro-lens of a specific focus detection pixel 311 is set on an optical axis 91 of the exchangeable lens unit 202. The pair of photoelectric conversion units 52 and 53 are disposed to the rear of the micro-lens 50. The micro-lens 60 of another focus detection pixel 311 is set off the optical axis 91 of the exchangeable lens unit 202. The pair of photoelectric conversion units 62 and 63 are disposed to the rear of the micro-lens 60.

An exit pupil 90 of the exchangeable lens unit 202 is set at a position assumed over a distance d4 to the front of the micro-lenses 50 and 60 disposed on the predetermined imaging plane of the exchangeable lens unit 202. The distance d4 takes a value determined in correspondence to the curvature and the refractive index of the micro-lenses 50 and 60, the distance between the micro-lenses 50 and 60 and the photoelectric conversion units 52/53 and 62/63 and the like. In the description, the distance d4 is referred to as a range-finding pupil distance.

The micro-lenses 50 and 60 are set at the predetermined imaging plane of the exchangeable lens unit 202. The shapes of the pair of photoelectric conversion units 52 and 53 are projected via the micro-lens 50 set on the optical axis 91 onto the exit pupil 90 set apart from the micro-lenses 50 by the projection distance d4 and the projected shapes define range-finding pupils 92 and 93. The shapes of the pair of photoelectric conversion units 62 and 63 are projected via the micro-lens 60 set off the optical axis 91 onto the exit pupil 90 set apart by the projection distance d4 and the projected shapes define range-finding pupils 92 and 93. Namely, the projecting direction for each pixel is determined so that the projected shapes (range-finding pupils 92 and 93) of the photoelectric conversion units in the individual pixels are aligned on the exit pupil 90 set over the projection distance d4.

The photoelectric conversion unit 52 outputs a signal corresponding to the intensity of an image formed on the micro-lens 50 with a focus detection light flux 72 having passed through the range-finding pupil 92 and having advanced toward the micro-lens 50. The photoelectric conversion unit 53 outputs a signal corresponding to the intensity of an image formed on the micro-lens 50 with a focus detection light flux 73 having passed through the range-finding pupil 93 and having advanced toward the micro-lens 50. Also, the photoelectric conversion unit 62 outputs a signal corresponding to the intensity of an image formed on the micro-lens 60 with a focus detection light flux 82 having passed through the range-finding pupil 92 and having advanced toward the micro-lens 60. The photoelectric conversion unit 63 outputs a signal corresponding to the intensity of an image formed on the micro-lens 60 with a focus detection light flux 83 having passed through the range-finding pupil 93 and having advanced toward the micro-lens 60. It is to be noted that the focus detection pixels 311 are arrayed in a direction matching the direction along which the pair of range-finding pupils are separated from each other.

Numerous focus detection pixels each structured as described above are arranged in a straight row and the outputs from the pairs of photoelectric conversion units at the individual pixels are integrated into output groups each corresponding to the range-finding pupils 92 and 93. Thus, information related to the intensity distribution of the pair of images formed on the focus detection pixel row with the individual focus detection light fluxes passing through the range-finding pupil 92 and the range-finding pupil 93 is obtained. Next, image shift detection calculation processing (correlational processing, phase difference detection processing) to be detailed later is executed by using the information thus obtained so as to detect the image shift amount between the pair of images through the pupil division-type detection method. The image shift amount is then multiplied by a predetermined conversion coefficient and, as a result, the extent of deviation (defocus amount) of the current image forming plane (the image forming plane on which the image is formed at the focus detection position corresponding to a specific micro-lens array position on the predetermined imaging plane) relative to the predetermined imaging plane can be calculated.

It is to be noted that FIG. 13 schematically shows the focus detection pixel (the micro-lens 50 and the pair of photoelectric conversion units 52 and 53) disposed on the optical axis 91 and the adjacent focus detection pixel (the micro-lens 60 and the pair of photoelectric conversion units 62 and 63). At each of the other focus detection pixels, too, the light fluxes arriving at the micro-lens from the pair of range-finding pupils are received at, the pair of photoelectric conversion units.

Figure 14:
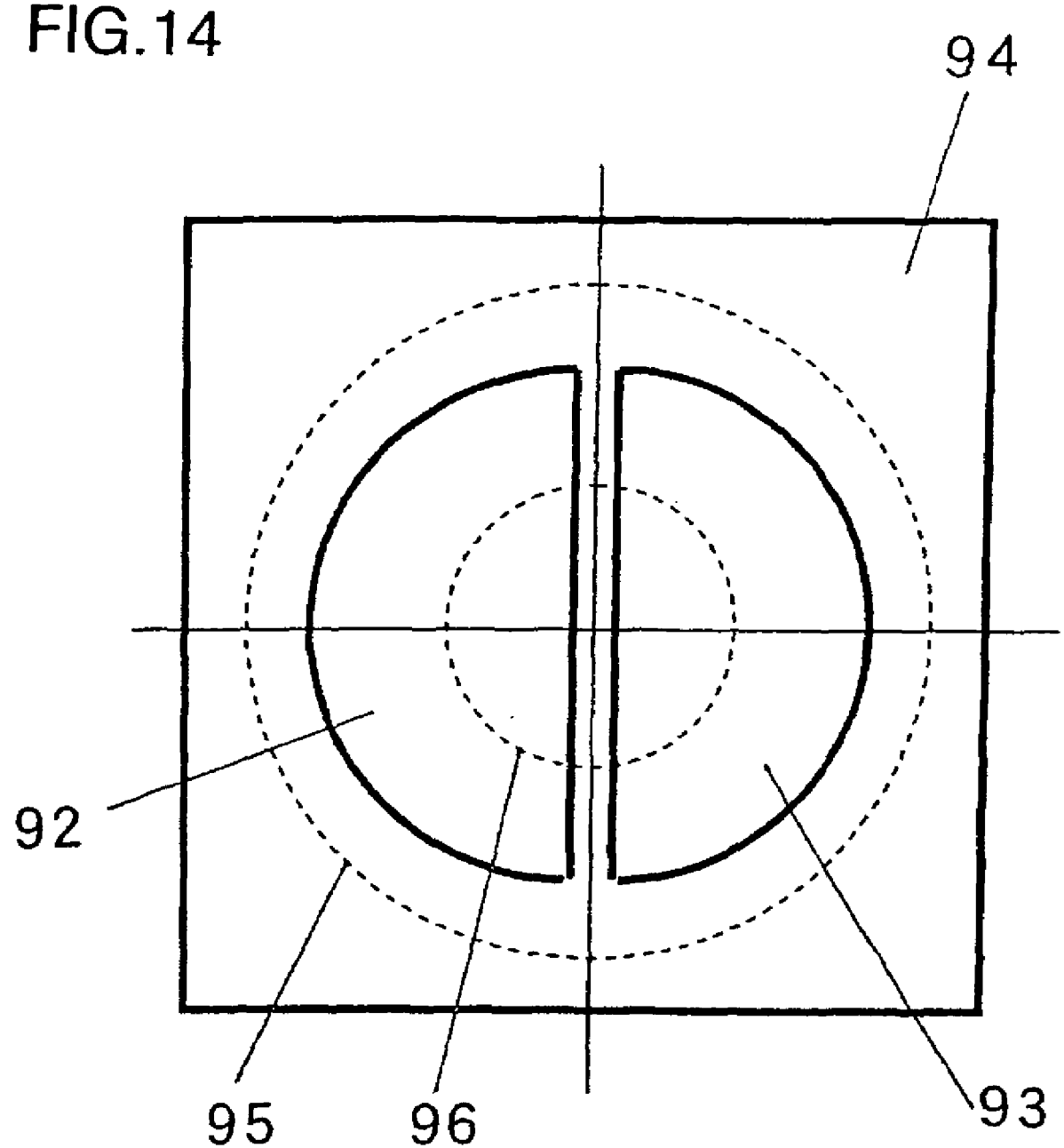
FIG. 14 is a front view, showing the relationship between the projection areas at the exit pupil.

FIG. 14 is a front view, showing the relationship between the projection areas at the exit pupil plane. The circle circumscribing the range-finding pupils 92 and 93 formed by projecting the pair of photoelectric conversion units 12 and 13 in the focus detection pixel 311 onto the exit pupil plane 90 via the micro-lens 10, viewed from the image forming plane, assumes a specific opening F value (referred to as a range-finding pupil F value in this description, F 2.8 in this example). The photoelectric conversion unit 11 in each imaging pixel 310 is projected onto the exit pupil plane 90 over an area 94 via the micro-lens 10. The area 94 is large enough to contain both the range-finding pupils 92 and 93.

An area 95 corresponds to an aperture (F 1) at the lightest setting, whereas an area 96 corresponds to an aperture (F 5.6) at a dark setting. The area 94 is greater than the area 95 or 96 and thus, the light flux received at the imaging pixel 310 is restricted at the aperture. In other words, the output from the imaging pixel 310 changes in correspondence to the aperture value. The range-finding pupils 92 and 93 are smaller than the area 95 but are larger than the areas 96. This means that the outputs from the focus detection pixels 311 remain unchanged even when the aperture value changes, as long as the aperture value corresponds to a setting brighter than F 2.8. However, if the aperture value corresponds to a setting darker than F 2.8, the outputs of the focus detection pixels 311 change in correspondence to the aperture value.

Figure 15:
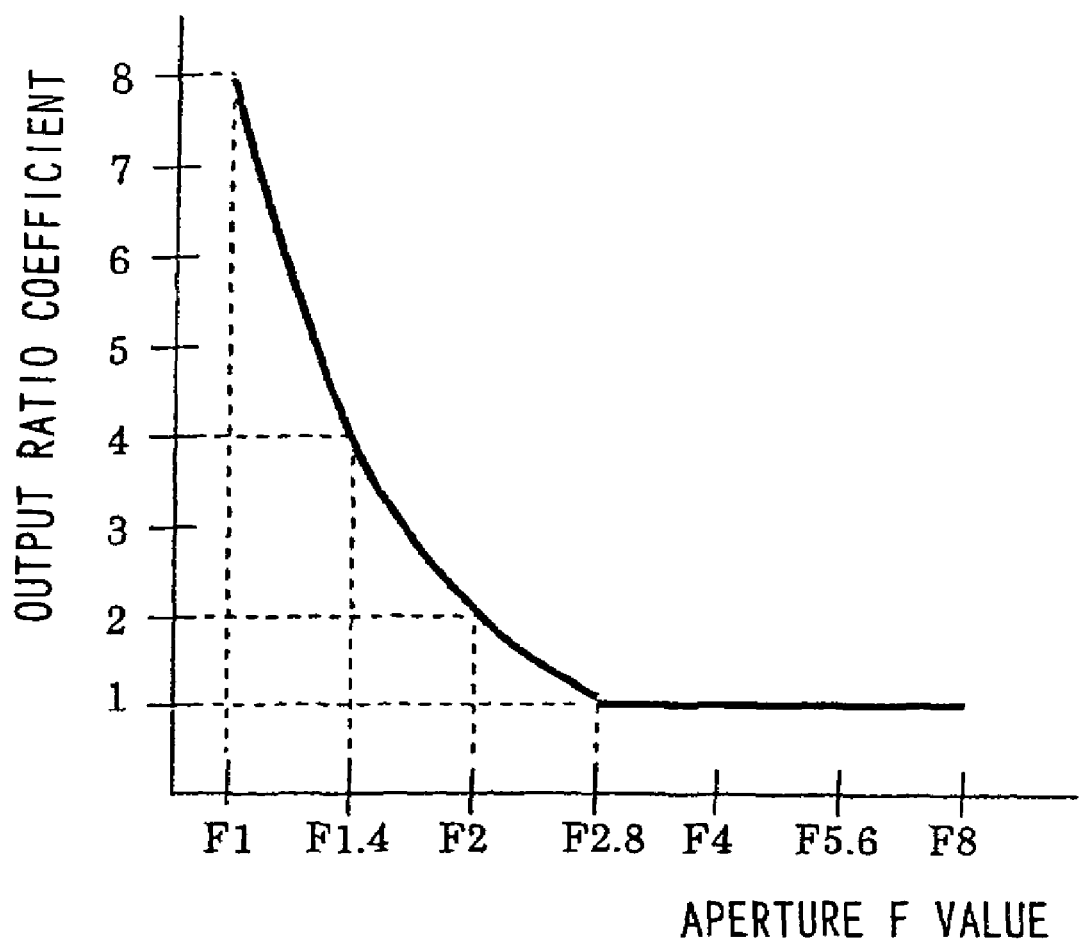
FIG. 15 shows the imaging pixel/focus detection pixel output ratio coefficient relative to the aperture F value.

FIG. 15 presents a graph of the output ratio coefficient (in a standardized form by assuming the value of 1 in correspondence to the aperture value F 2.8), indicating the ratio; imaging pixel output/focus detection pixel output. As shown in FIG. 15, the output ratio coefficient assumes a constant value 1 regardless of the aperture value as long as it indicates a setting darker than F 2.8, whereas the output ratio coefficient increases in proportion to the aperture value once the aperture value assumes a setting brighter than F 2.8.

Figure 16:
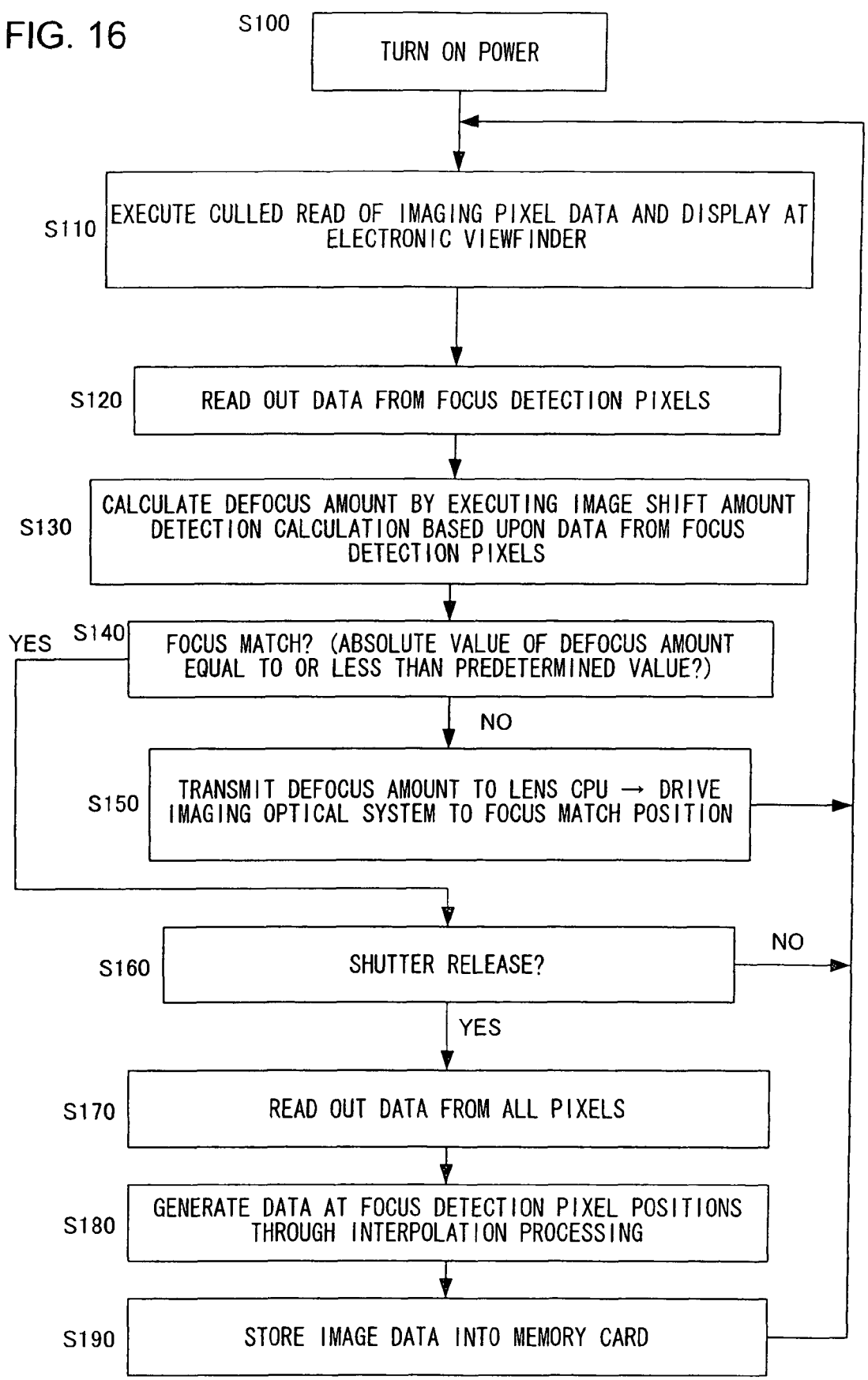
FIG. 16 presents a flowchart of the operations executed in the digital still camera in the embodiment.

FIG. 16 presents a flowchart of the operations executed in the digital still camera (imaging device) in the embodiment. After the power is turned on at the camera body 203 in step S100, the camera drive control device 212 repeatedly executes the processing in step S110 and subsequent steps. In step S110, a culled read of the data from the imaging pixels 310, is executed and the data thus read out through the culled read are displayed at the electronic viewfinder (LCD 215). The number of sets of data from the focus detection pixels 311 read out through the culled read of the data from the imaging pixels 310 should be minimized, so as to assure better display quality. However, data from the focus detection pixels 311 may also be read out through the culled read and the focus detection pixel outputs in an uncorrected form may be displayed on the electronic viewfinder (LCD 215) so as to enable the user to identify the focus detection position with ease.

In step S120 following step S110, data are read out from the focus detection pixel row. It is to be noted that the focus detection area has been selected by the photographer via a selection means (not shown). In step S130 following step S120, the defocus amount is calculated by executing image shift detection calculation processing based upon the pair of image data corresponding to the focus detection pixel row.

The image shift detection calculation processing (correlational algorithm) is now explained in reference to FIG. 17. A correlation quantity C(L) is first calculated by using the differential correlational algorithm expressed in (1) below, with ei and fi (i=1 to m) representing the pair of sets of data corresponding to each focus detection pixel row.

$$C(L) = \Sigma |e(i+L) - f(i)| \quad (1)$$

L in expression (1) is an integer representing the relative shift amount indicated in units corresponding to the pitch at which the pair of sets of data are detected. In addition, L assumes a value within a range Lmin to Lmax (−5 to +5 in the figure). Σ indicates total sum calculation over a range expressed as i=p to q, with p and q satisfying a conditional expression $1 \leq p < q \leq m$. The specific values assumed for p and q define the size of the focus detection area.

Figure 17A:
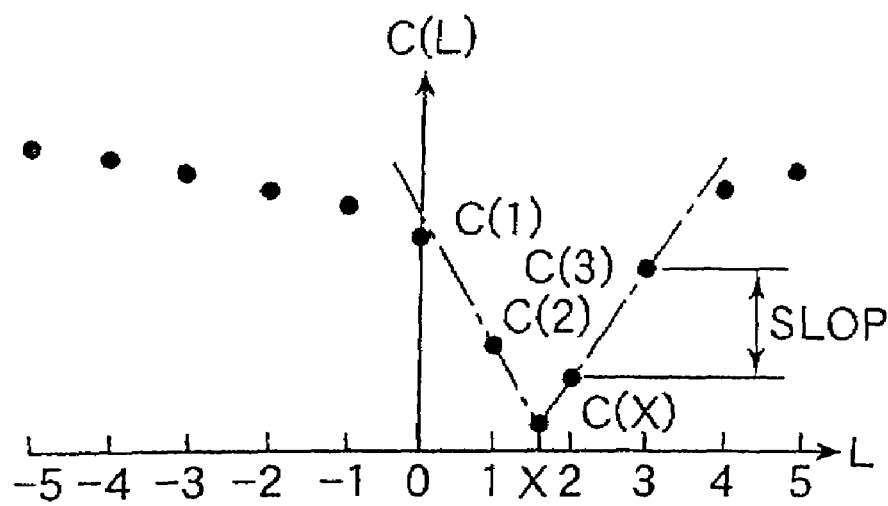
FIGS. 17A-17C present a flowchart of the image offset detection calculation processing (correlational algorithm)

As shown in FIG. 17A, the results of the calculation executed as expressed in (1) indicate the smallest correlation quantity C(L) in correspondence to the shift amount L=kj (kj=2 in FIG. 17A) indicating a high level of correlation between the pair of sets of data. Next, a shift amount x, which will provide the minimum value C(L)min=C(x) in a continuous curve representing the correlation quantities, is determined through the three-point interpolation method as expressed in (2) to (5) below.

$$x = kj + D/SLOP \quad (2)$$

$$C(x) = C(kj) - |D| \quad (3)$$

$$D = \{C(kj-1) - C(kj+1)\}/2 \quad (4),$$

$$SLOP = MAX\{C(kj+1) - C(kj), C(kj-1) - C(kj)\} \quad (5)$$

In addition, a defocus amount DEF representing the extent of defocusing of the subject image plane relative to the predetermined imaging plane can be determined as expressed in (6) below based upon the shift amount x having been calculated as expressed in (2).

$$DEF = KX \cdot PY \cdot x \quad (6)$$

PY in expression (6) represents the detection pitch, whereas KX in expression (6) represents the conversion coefficient that is determined in correspondence to the opening angle formed with the gravitational centers of the pair of range-finding pupils.

Figure 17B:
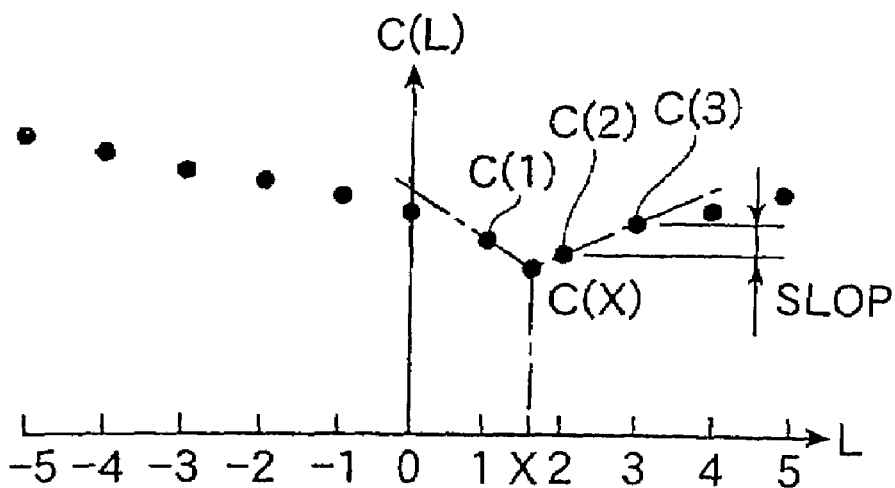

The judgment as to whether or not the calculated defocus amount DEF is reliable is made as follows. As shown in FIG. 17B, the interpolated minimum value C(X) of the correlation quantity increases when the level of correlation between the pair of sets of data is low. Accordingly, if C(X) is equal to or greater than a predetermined value the defocus amount is judged to be less-reliable. Alternatively, C(X) may be standardized with regard to the data contrast, and in such a case, if the value obtained by dividing C(X) by SLOP indicating a value in proportion to the contrast is equal to or greater than a predetermined value, the defocus amount should be judged to be not reliable. As a further alternative, if SLOP indicating the value in proportion to the contrast is equal to or less than a predetermined value, the subject should be judged to be a low contrast subject and, accordingly, the reliability of the calculated defocus amount DEF should be judged to be low.

Figure 17C:
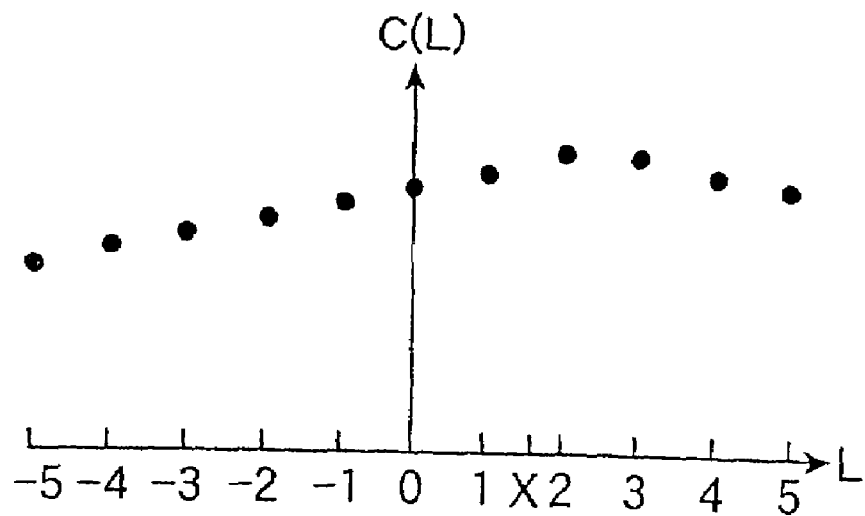

If the level of correlation between the pair of sets of data is low and the correlation quantity C(L) does not dip at all over the shift range Lmin to Lmax, as shown in FIG. 17C, the minimum value C(X) cannot be determined. Under such circumstances, it is judged that the focus detection is disabled.

To continue the explanation of the camera operations in reference to FIG. 16, a decision is made in step S140 as to whether or not the focusing lens 207 is set near the focus match position i.e., whether or not the absolute value of the defocus amount having been calculated is equal to or less than a predetermined value. If it is decided that the focusing lens 207 is not near the focus match position, the operation proceeds to step S150. In step S150, the defocus amount is transmitted to the lens drive control device 209 in the exchangeable lens unit 202. The lens drive control device 209 drives the focusing lens 207 in the exchangeable lens unit 202 to the focus match position. Once the processing in step S150 is executed, the operation returns to step S110 to repeatedly execute the operations described above.

It is to be noted that if it is decided in step S140 that the focus detection is not possible, too, the operation proceeds to step S150. In this situation, a scan drive instruction is transmitted to the lens drive control device 209 in the exchangeable lens unit 202. In response, the lens drive control device 209 drives the focusing lens 207 in the exchangeable lens unit 202 to scan through the infinity to close-up range. Once the processing in step S150 is executed, the operation returns to step S110 to repeatedly execute the operations described above.

If, on the other hand, it is decided in step S 140 that the focusing lens 207 is set near the focus match position, the operation proceeds to step S160. In step S160, a decision is made as to whether or not a shutter release has been executed through an operation at a shutter release button (not shown). If it is decided that a shutter release has not been executed, the operation returns to step S110 to repeatedly execute the operations described above. If, on the other hand, it is decided that a shutter release has been executed, the operation proceeds to step S170.

In step S170, an aperture adjustment instruction is transmitted to the lens drive control device 209 in the exchangeable lens unit 202 to adjust the aperture value at the exchangeable lens unit 202 to a control E value (an F value set by the user or an automatically selected F value). Once the aperture control ends, the image sensor 211 is engaged in imaging operation and image data from the imaging pixels 310 and all the focus detection pixels 311 at the image sensor 211 are read out.

In step S180 following step S170, image data at pixel positions occupied by the focus detection pixels in the focus detection pixel row are interpolated based upon the data output from the focus detection pixels 311 and the data output from the surrounding imaging pixels 310. This interpolation processing is to be described in detail later. In step S190 following step S180, image data constituted with the data output from the imaging pixels 310 and the interpolation data at the focus detection pixels 311 are saved into the memory card 213. Once the image data are saved, the operation returns to step S110 to repeatedly execute the operations described above.

Figure 18:
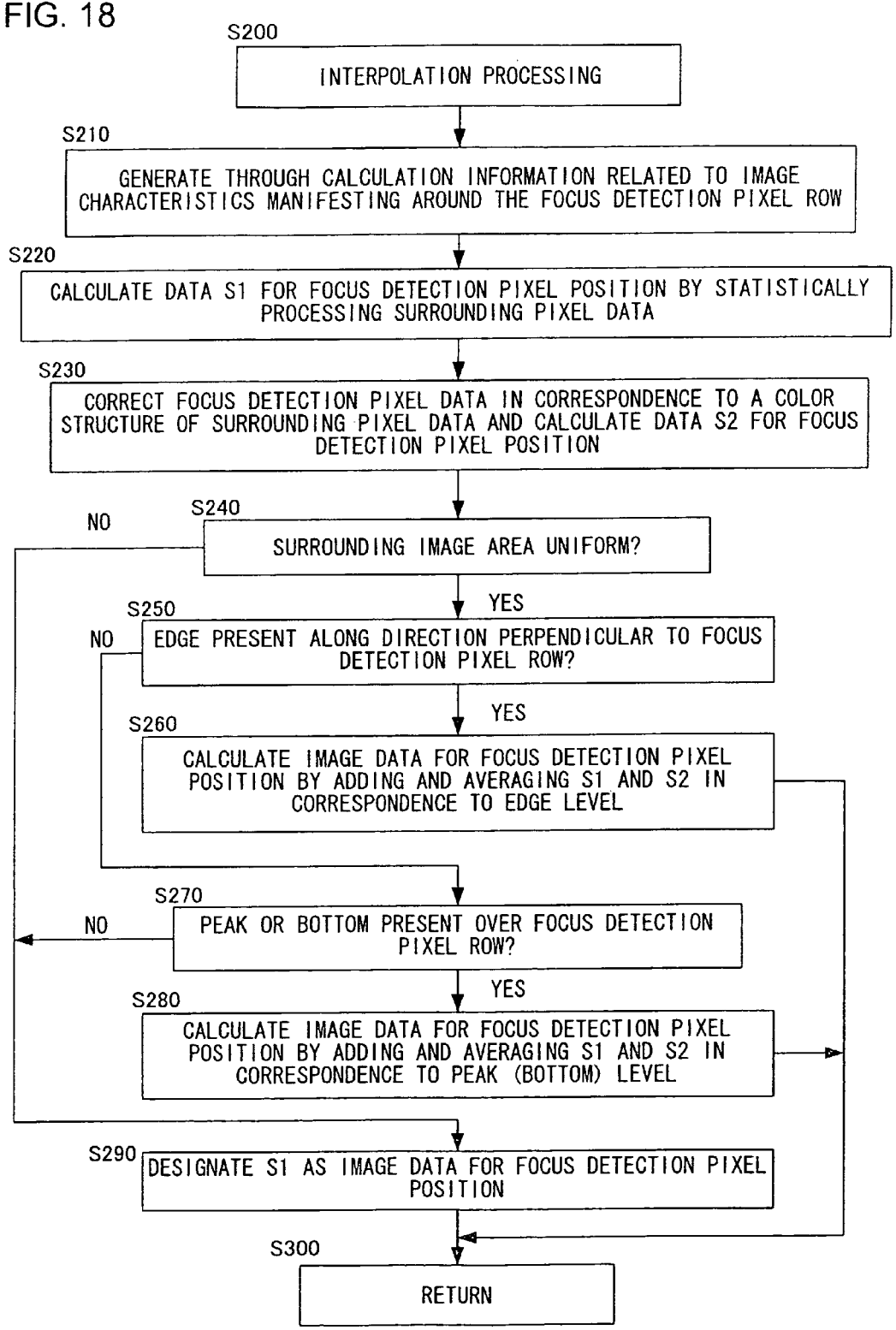
FIG. 18 presents a flowchart of the interpolation processing.

FIG. 18 presents a flowchart of the interpolation processing. To facilitate the explanation, the output from a green pixel (a pixel with the green filter) in the imaging pixel 310 is referred to as Gn, the output from a red pixel (a pixel with the red filter) in the imaging pixel 310 is referred to as Rn, the output from a blue pixel (a pixel with the blue filter) in the imaging pixel 310 is referred to as Bn and the output from a focus detection pixel 311 is referred to as AFn (n=1, 2, ... ), as shown in FIG. 19. It is to be noted that while the flow of the interpolation processing is explained in reference to a specific target pixel, similar processing is executed for all the focus detection pixels 311. The following explanation focuses on the interpolation executed to obtain image data (a virtual imaging pixel output at a focus detection pixel X) at the focus detection pixel X (output AF 3) that would otherwise be occupied by a blue pixel and on the interpolation executed to generate image data (a virtual imaging pixel output at a focus detection pixel Y) at the focus detection pixel Y (output AF 2) that would otherwise be occupied by a green pixel.

After starting the interpolation processing in step S200, information related to the characteristics of the image ranging around the focus detection pixel row is obtained through calculation in step S 210. Namely, the parameters (Gau, Gad, Rau, Rad, Bau and Bad) indicating the average values of the individual colors on the two sides above and below the focus detection pixel row, the parameters (Gnu, Gnd, Rnu, Rnd, Bnu and Bnd) indicating the extents of variance with regard to the individual colors on the two sides above and below the focus detection pixel row, and the color composition ratios (Kg, Kr and Kb) around the focus detection pixels are calculated.

$$Gau=(G1+G2+G3+G4+G5)/5,$$

$$Gad=(G6+G7+G8+G9+G10)/5,$$

$$Rau=(R1+R2)/2,$$

$$Rad=(R3+R4)/2,$$

$$Bau=(B1+B2+B3)/3,$$

$$Bad=(B4+B5+B6)/3,$$

$$Gnu=(|G3-G1|+|G1-G4|+|G4-G2|+|G2-G5|)/(4\times Gau),$$

$$Gnd=(|G6-G9|+|G9-G7|+|G7-G10|+|G10-G8|)/(4\times Gad),$$

$$Rnu=|R1-R2|/Rau,$$

$$Rnd=|R3-R4|/Rad,$$

$$Bnu=(|B1-B2|+|B2-B3|)/(2\times Bau),$$

$$Bnd=(|B4-B5|+|B5-B6|)/(2\times Bad),$$

$$Kg=(Gau+Gad)/(Gau+Gad+Rau+Rad+Bau+Bad),$$

$$Kr=(Rau+Rad)/(Gau+Gad+Rau+Rad+Bau+Bad),$$

$$Kb=(Bau+Bad)/(Gau+Gad+Rau+Rad+Bau+Bad) \quad (7)$$

It is to be noted that the color composition ratios Kg, Kr and Kb each indicate the output composition ratio of the imaging pixel output that would be provided by the specific color imaging pixel that would otherwise be positioned at the target focus detection pixel, relative to the outputs from the imaging pixels corresponding to all the colors, calculated based upon the outputs from the imaging pixels surrounding the focus detection pixel.

In step S220 following step S210, the data from the imaging pixels 310 surrounding the focus detection pixel 311 are statistically processed to calculate image data S1 at the particular focus detection pixel 311. The image data S1, which may be either image data S1 (X) corresponding to the focus detection pixel X or image data S1 (Y) corresponding to the focus detection pixel Y, can be obtained as expressed in (8) below.

$$S1(X)=(B2+B5)/2,$$

$$S1(Y)=(G3+G4+G6+G7)/4 \quad (8)$$

The blue pixels, disposed at lower arraying density compared to the green pixels, are located further away from the focus detection pixel X (output AF 3). For this reason, a pattern with fine lines or the like may be present between the focus detection pixel X (output AF 3) and the surrounding blue pixels, which would greatly alter the image pattern to result in an error in S1 (X) calculated as expressed in (8).

This problem may be prevented by first correcting the blue pixel outputs to blue pixel outputs that would be generated at the green pixels around the focus detection pixel X (output AF 3), in correspondence to the outputs from the green pixels near the blue pixels and the outputs from the green pixels near the focus detection pixel X (output AF 3) and then taking the average of the corrected blue pixel outputs.

$$S1(X)=B2\times G4/(G1+G2)+B5\times G7/(G9+G10) \quad (9)$$

The extent of the error in the data generated as expressed in (9) is reduced, since the average is taken after converting the blue pixel outputs from the blue pixels disposed at low density to blue pixel outputs that would be provided at positions in the vicinity of the focus detection pixel X (output AF 3) in correspondence to the changes occurring in the outputs from the green pixels disposed at higher density.

The method adopted when calculating through statistical processing the image data S1 at the focus detection pixel X or Y is not limited to the simple averaging expressed in (9). For instance, image data corresponding to the focus detection pixel X or Y may be obtained through linear interpolation by using the outputs from nearby pixels assuming a plurality of positions along the vertical direction, through interpolation executed by using expressions of multiple degrees, i.e., expressions of at least second degrees, or through median processing.

In step S230, the output from the focus detection pixel 311 is corrected in correspondence to the color composition ratios calculated by using the data from the imaging pixels 310 surrounding the focus detection pixel 311, and thus, image data S2 at the focus detection pixel 311 are calculated. The image data S2 may be either image data S2 (X) (a virtual imaging pixel output calculated in correspondence to the position occupied by the focus detection pixel X) corresponding to the focus detection pixel X or image data S2 (Y) (a virtual image pixel output calculated in correspondence to the position occupied by the focus detection pixel Y) corresponding to the focus detection pixel Y, and are calculated as expressed in (10) below.

$$S2(X)=AF3\times Kb\times Ks\times kc,$$

$$S2(Y)=AF2\times Kg\times Ks\times Kc \quad (10)$$

The coefficient Ks in expression (10) is the output ratio coefficient having been explained in reference to FIG. 15, which assumes a value selected in correspondence to the control F value (aperture F value) set for the imaging operation. More specifically, a lookup table containing paired-up F value data and output ratio coefficient data, as indicated in the graph in FIG. 15, which is stored in advance in the camera drive control device 212, is used. If the output ratio coefficient curve changes in correspondence to the position of the focus detection area (the distance from the optical axis) or the exit pupil distance (the distance between the image sensor and the exit pupil) of the exchangeable lens unit 202, a plurality of lookup tables each corresponding to a specific set of the focus detection area position and the exit pupil distance should be prepared. Then, based upon the focus detection position and the exit pupil distance of the exchangeable lens unit 202 (indicated in the lens information), the matching lookup table should be selected and used.

The coefficient Kc in expression (10) is an adjustment coefficient used to adjust the discrepancy in the quantity of received light, which is attributed to the difference between the spectral characteristics of the focus detection pixels 311 and the spectral characteristics of the imaging pixels 310. A value obtained through advance measurement is stored as the coefficient Kc in the camera drive control device 212. The adjustment coefficient Kc may be calculated as expressed in (11) below with Sg, Sr, Sb and Sa respectively representing the outputs from the green pixels, the red pixels, the blue pixels and the focus detection pixels generated as an image of a planar light source achieving flat light emission characteristics over the visible light range is captured at the image sensor 211 via an imaging optical system with an aperture at a setting darker than F 2.8.

$$Kc=(Sg+Sr+Sb)/Sa \quad (11)$$

In step S240, a decision is made as expressed in the following expression in (12) to determine whether or not the image area around the focus detection pixel 311 is uniform. When the focus detection pixel X is the target pixel, the surrounding image area is judged to be uniform if the following conditions (12) are satisfied.

$$Bnu<T1 \text{ and } Bnd<T1 \quad (12)$$

T1 in expression (12) represents a predetermined threshold value. If, on the other hand, the focus detection pixel Y is the target pixel, the surrounding image is judged to be uniform if the following conditions (13) are satisfied.

$$Gnu<T2 \text{ and } Gnd<T2 \quad (13)$$

T2 in expression (13) represents a predetermined threshold value. If the surrounding image is judged to be nonuniform, the operation proceeds to step S290 to designate the data S1 having been obtained through the statistical processing executed in step S220 as the image data S at the focus detection pixel 311. Namely, if the image is not uniform, the data S1 obtained through the statistical processing which is simple averaging processing are used, since the processing for calculating the color composition ratio data S2 would be complicated under such circumstances. Even if there is an error in the data S1 generated through the statistical processing, the error will not be noticeable since the surrounding image area is not uniform and a significant change occurs over the surrounding image area.

If, on the other hand, it is decided that the surrounding image is uniform, the operation proceeds to step S250. In step S250, a decision is made by comparing the sets of information sampled around the focus detection pixel row, i.e., from the sides above and below the focus detection pixel row, as to whether or not there is an edge pattern that indicates a change in the pixel outputs along the direction perpendicular to the focus detection pixel row. For the target focus detection pixel X, it is determined that an edge pattern indicating a change in the pixel outputs along the direction perpendicular to the focus detection pixel row is present if the conditions expressed in (14) are satisfied.

$$|Bau-Bad|>T3 \quad (14)$$

T3 in expression (14) represents a predetermined threshold value. For the target focus detection pixel Y, it is determined that an edge pattern indicating a change in the pixel outputs along the direction perpendicular to the focus detection pixel row is present if the conditions expressed in (15) are satisfied.

$$|Gau-Gad|>T4 \quad (15)$$

T4 in expression (15) represents a predetermined threshold value.

If it is decided that there is an edge pattern indicating a change in the imaging pixel outputs along the direction perpendicular to the focus detection pixel row, the operation proceeds to step S260. In step S260, the data S1 resulting from the statistical processing and the color composition ratio data S2 are weighted in correspondence to an edge level Kbe or Kge and image data S at the focus detection pixel 311 are obtained through weighted addition. Once the processing in step S260 is executed, the operation returns from step S300 to the program shown in FIG. 16, thereby ending the interpolation processing.

The edge levels Kbe and Kge, each indicating the steepness of the edge slope and the increments with which the edge is staged, are calculated as follows. If the focus detection pixel X is the target pixel, the edge level Kbe is calculated as;

$$Kbe=|Bnu-Bnd|/(T5-T3),$$

IF Kbe>1 THEN Kbe=1, $$S=(1-Kbe)\times S1(X)+Kbe\times S2(X) \quad (16)$$

T5 in expression (16) represents a predetermined threshold value (>T3). If the edge level Kbe is high (=1), S=S2(X). If the focus detection pixel Y is the target pixel, the edge level Kg is calculated as;

$$Kge=|Gnu-Gnd|/(T6-T4),$$

IF Kge>1 THEN Kge=1, $$S=(1-Kge)\times S1(Y)+Kge\times S2(Y) \quad (17)$$

T6 in expression (17) represents a predetermined threshold value (>T4). If the edge level Kge is high (=1), S=S2(Y)

Over the range in which the edge level expressed in (16) or (17) shifts from low to high, the image data S at the focus detection pixel 311 are obtained as the sum of the data S1 resulting from the statistical processing and the data S2 calculated based upon the color composition ratio, which are individually weighted by using the edge level Kbe or Kge. As a result, stable image data can be obtained since the image data S does not change abruptly regardless of whether the edge judging results in an affirmative judgment or a negative judgment. Values that will provide the optimal image quality are selected for the predetermined threshold values T3 to T6 in correspondence to the characteristics and the like of the optical low pass filter (not shown) mounted at the image sensor 211. For instance, if an optical low pass filter achieving a significant filtering effect is mounted, the edge pattern will be blurred and accordingly, less rigorous (smaller) values should be selected for the predetermined threshold values T3 to T6.

If it is decided that there is no edge pattern indicating a change in the imaging pixel outputs along the direction perpendicular to the focus detection pixel row, the operation proceeds to step S270. In step S270, the focus detection pixel output and the information sampled from the surrounding pixels present above and below the focus detection pixel are compared to make a decision as to whether or not a fine line pattern is present over the focus detection pixel row or over an area near the focus detection pixel row. The term "fine line pattern" in this context refers to a peak pattern showing a pixel output spiking upward, away from the average value of the pixel output, or a bottom pattern showing a pixel output spiking downward away from the average value of the pixel output. If the focus detection pixel X is the target pixel, a fine line pattern is judged to be present when the conditions in (18) are satisfied.

$$|S1(X)-S2(X)|>T7 \quad (18)$$

T7 in expression (18) represents a predetermined threshold value. Alternatively, the decision may be made as expressed in (19) below instead of expression (18).

$$|(Bau+Bad)/2-S2(X)|>T7 \quad (19)$$

T7 in expression (19) represents a predetermined threshold value.

If the focus detection pixel Y is the target pixel, a fine line pattern is judged to be present when the conditions in (20) are satisfied.

$$|S1(Y)-S2(Y)|>T8 \quad (20)$$

T8 in expression (20) represents a predetermined threshold value. Alternatively, the decision may be made as expressed in (21) below instead of expression (20).

$$|(Gau+Gad)/2-S2(Y)|>T8 \quad (21)$$

T8 in expression (21) represents a predetermined threshold value.

If it is decided that there is no fine line pattern, the operation proceeds to step S290 to designate the data S1 obtained through the statistical processing executed in step S220 as the image data at the focus detection pixel 311, since the data obtained through the statistical processing do not manifest a significant error as long as the image surrounding the focus detection pixel 311 is uniform and no image pattern is present over the focus detection pixel row.

If, on the other hand, it is decided that a fine line pattern is present, the operation proceeds to step S280. In step S280, the data S1 obtained through the statistical processing and the color composition ratio data S2 are weighted in correspondence to a peak/bottom level Kbp or Kgp and the image data S at the focus detection pixel 311 are obtained as the sum of the weighted data S1 and S2. Subsequently, the operation returns from step S300 to the program shown in FIG. 16, thereby ending the interpolation processing.

The peak/bottom levels Kbp and Kgp, each indicating the level of the peak or the bottom and also the steepness of the peak or the bottom, are calculated as follows. If the focus detection pixel X is the target pixel, Kbp is calculated as;

$$Kbp=|S1(X)-S2(X)|/(T9-T7),$$

or $$Kbp=|(Bau+Bad)/2-S2(X)|/(T9-T7),$$

IF Kbp>1 THEN Kbp=1, $$S=(1-Kbp)\times S1(X)+Kbp\times S2(X) \quad (22)$$

T9 in (22) represents a predetermined threshold value (>T7) As indicated above, if the peak/bottom level Kbp is high (=1), S=S2 (X).

If the focus detection pixel Y is the target pixel, Kgp is calculated as;

$$Kgp=|S1(Y)-S2(Y)|/(T10-T8),$$

or $$Kgp=|(Gau+Gad)/2-S2(Y)|/(T10-T8),$$

IF Kgp>1 THEN Kgp=1, $$S=(1-Kgp)\times S1(Y)+Kgp\times S2(Y) \quad (23)$$

T10 in (23) represents a predetermined threshold value (>T8) As indicated above, if the peak or bottom level Kgp is high (=1), S=S2 (Y).

As indicated in expressions (22) and (23), over the range in which the peak/bottom level shifts from low to high, the image data S at the focus detection pixel 311 are obtained as the sum of the data S1 resulting from the statistical processing and the data S2 calculated based upon the color composition ratio, which are individually weighted by using the peak/bottom level Kbp or Kgp. As a result, stable image data can be obtained since the image data S does not change abruptly regardless of whether the fine line judging results in an affirmative judgment or a negative judgment.

Values that will provide the optimal image quality are selected for the predetermined threshold values T7 to T10 in correspondence to the characteristics and the like of the optical low pass filter (not shown) mounted at the image sensor 211. For instance, if an optical low pass filter achieving a significant filtering effect is mounted, the fine line pattern will be blurred and accordingly, less rigorous (smaller) values should be selected for the predetermined threshold values T7 to T10.

In step S290, the data S1 obtained by statistically processing the data from only the imaging pixels 310 around the focus detection pixel 311 are designated as the image data S at the focus detection pixel, and the operation proceeds to step S300. In step S300, the interpolation processing ends and the operation returns to the program shown in FIG. 16.

(Variations of the Embodiment)

Figure 20:
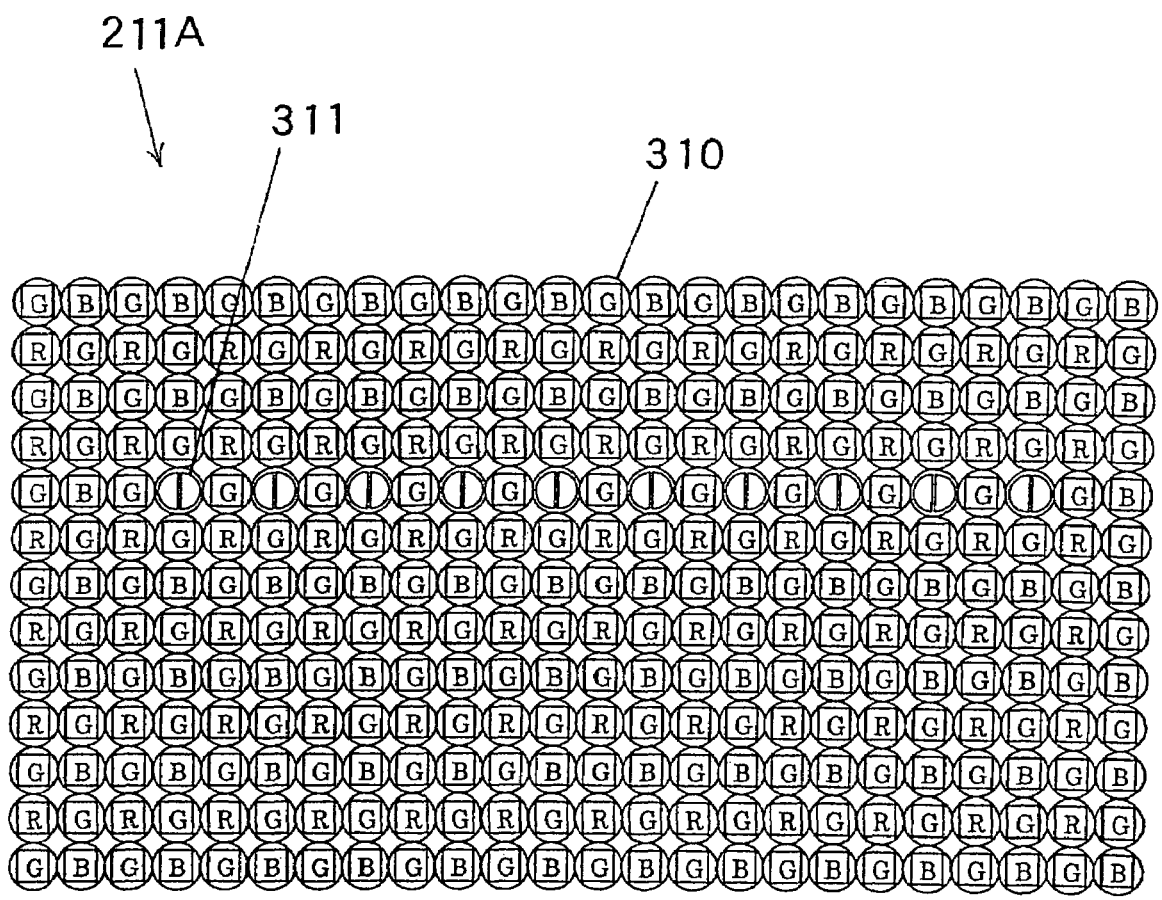
FIG. 20 shows the image sensor in a variation.
Figure 21:
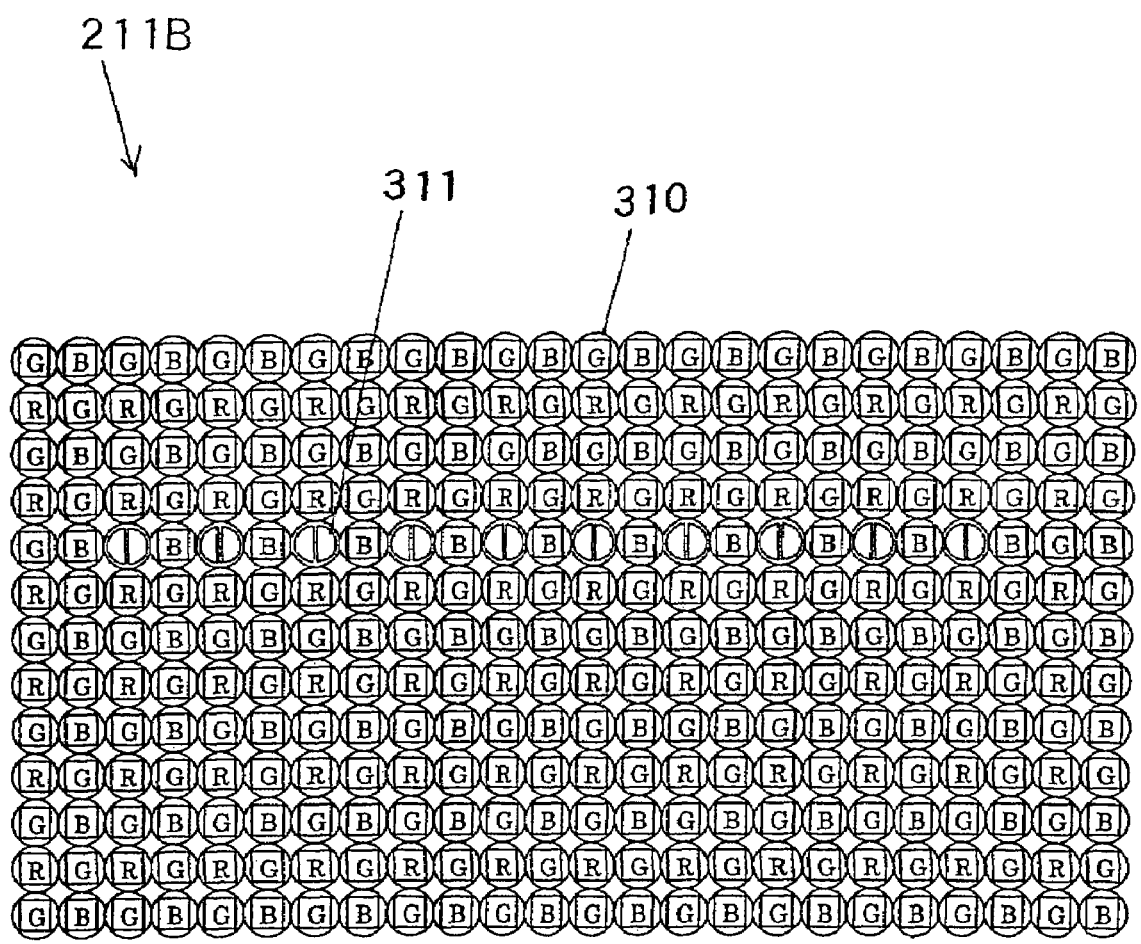
FIG. 21 shows the image sensor in yet another variation.

While the image sensor 211 in FIG. 7 includes the focus detection pixels 311 disposed without allowing any interval, the focus detection pixels 311 may each be set so as to occupy every other pixel position as in an image sensor 211A in FIG. 20 or an image sensor 211B in FIG. 21, instead. FIG. 20 is a partial enlargement of the image sensor 211A which includes the focus detection pixels 311 arrayed in a single row so as to occupy positions that would otherwise be occupied by blue pixels. FIG. 21 is a partial enlargement of the image sensor 211B which includes the focus detection pixels 311 arrayed in a single row so as to occupy positions that would otherwise be occupied by green pixels. While the focus detection accuracy is somewhat lowered when the arraying pitch (arraying interval) with which the focus detection pixels 311 are disposed is increased, the quality of the image having undgergone the interpolation processing explained earlier is improved since the focus detection pixels 311 are set with a lower density at the image sensor 211A or 211B.

At the image sensor 211A in FIG. 20, a greater number of green pixels are present around the focus detection pixels AF 1 to AF 5 disposed at positions that would otherwise be occupied by blue pixels, as shown in FIG. 22. Thus, the image data for the position occupied by the target focus detection pixel can be calculated with an even higher level of accuracy by using the outputs G11 and G12 from the green pixels to further improve the quality of the image resulting from the, interpolation processing. In addition, since imaging pixels 310 are disposed between the individual focus detection pixels 311, the decisions as to whether or not there is an edge pattern and whether or not there is a fine line pattern superimposed over the focus detection pixel row can be made more accurately by comparing the outputs from the imaging pixels 310 present in the row of the focus detection pixels 311 with the outputs from the imaging pixels 310 present around the focus detection pixel row.

For instance, at the image sensor shown in FIG. 22, the data S1 (X) may be obtained through statistical processing for the position occupied by the focus detection pixel 311 with the output AF3, as expressed in (24) instead of expression (9).

$$S1(X)=(B2\times(G11+G12)/(G1+G2)+B5\times(G11+G12)/(G9+G10))/2 \quad (24)$$

In the image sensor 211B shown in FIG. 21, the extent to which the image quality is affected by the correction-related error can be minimized as the focus detection pixels 311 are disposed at positions that would otherwise be occupied by green pixels arrayed with a higher level of density in the Bayer array.

Figure 23:
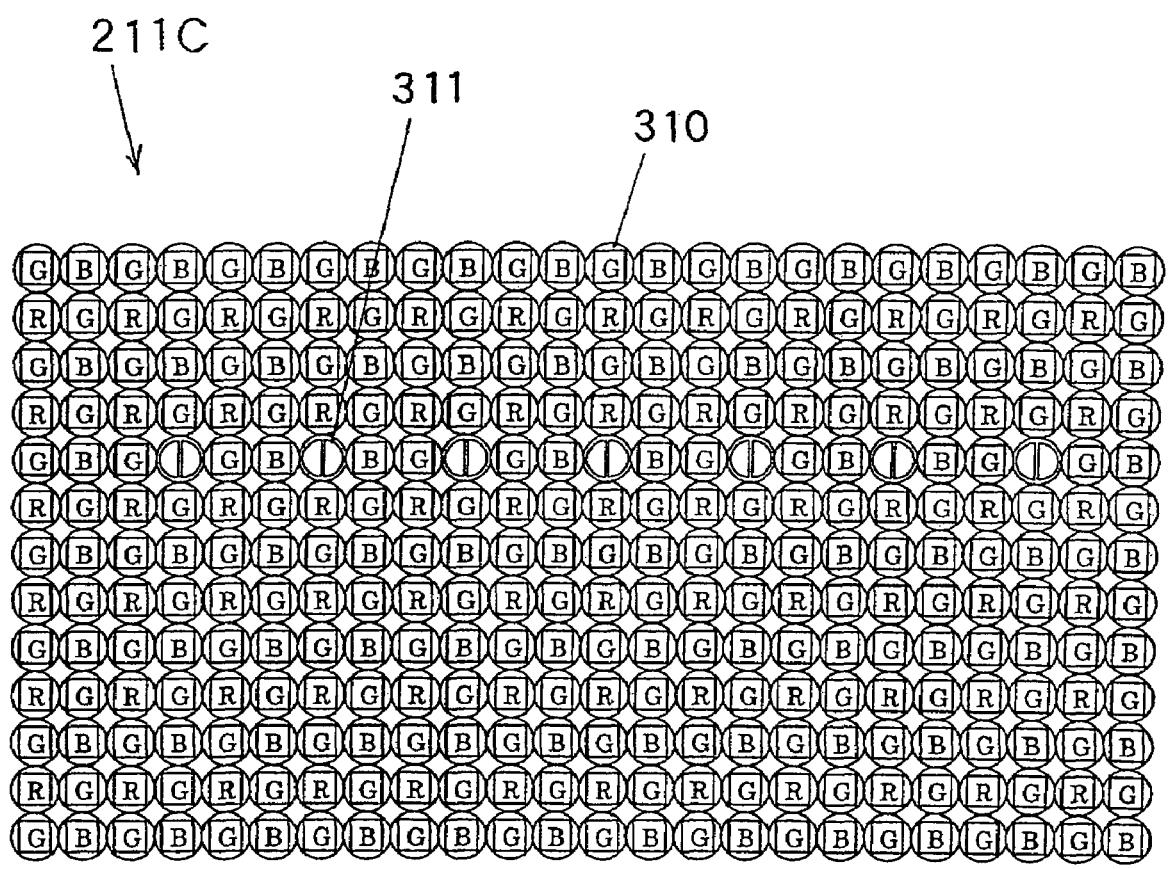
FIG. 23 shows the image sensor in yet another variation.

At an image sensor 211C shown in FIG. 23, focus detection pixels 311 are set by allowing two-pixel intervals. While the focus detection accuracy is somewhat compromised as the arraying pitch (arraying interval) for the focus detection pixels 311 increases, the quality of the corrected image is further improved since the focus detection pixels 311 are not disposed as densely. In addition, a green pixel and a blue pixel are set over each interval between the focus detection pixels 311. Accordingly, by comparing the green pixel outputs/blue pixel outputs from the green and blue pixels present in the row of focus detection pixels 311 with the green pixel output/blue pixel outputs from the green and blue pixels present around the focus detection pixel row, decisions as to whether or not a green or blue edge pattern is present over the focus detection pixel row and whether or not a green or blue fine line pattern is present over the focus detection pixel row can be made with better accuracy.

Figure 24:
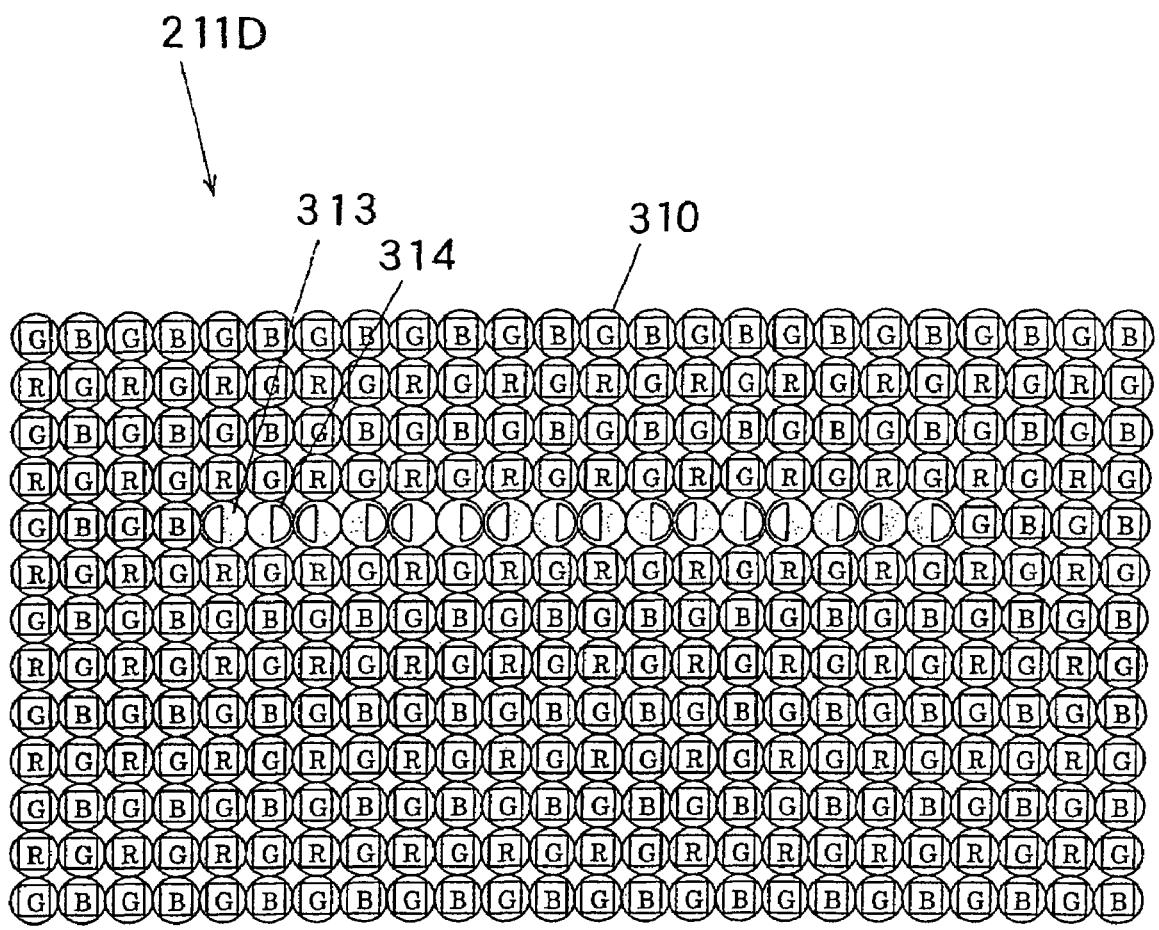
FIG. 24 shows the image sensor in yet another variation.

In the image sensor 211 shown in FIG. 7, the focus detection pixels 311 each include a pair of photoelectric conversion units 12 and 13. FIG. 24 shows an alternative image sensor 211D with focus detection pixels 313 and 314 each equipped with a single photoelectric conversion unit. Each focus detection pixel 313 and the adjacent focus detection pixel 314 in FIG. 24 form a pair, and this pair of focus detection pixels 313 and 314 is equivalent to one focus detection pixel 311 shown in FIG. 7.

Figure 25A:
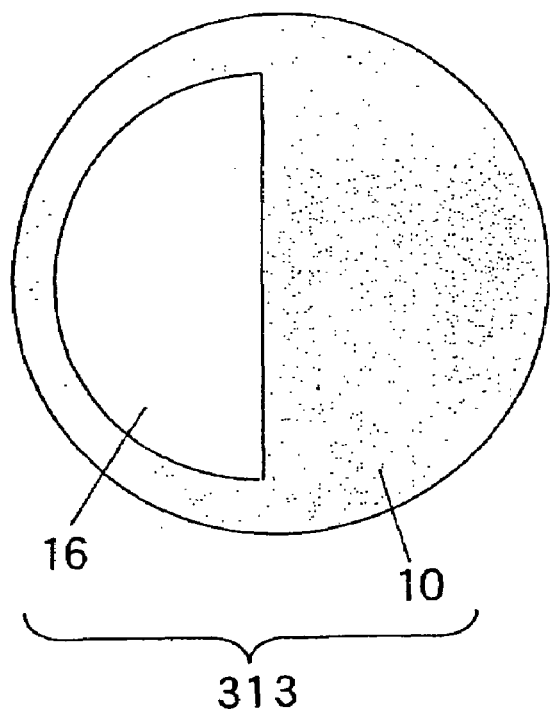
FIGS. 25A and 25B show a variation of the focus detection pixels.
Figure 25B:
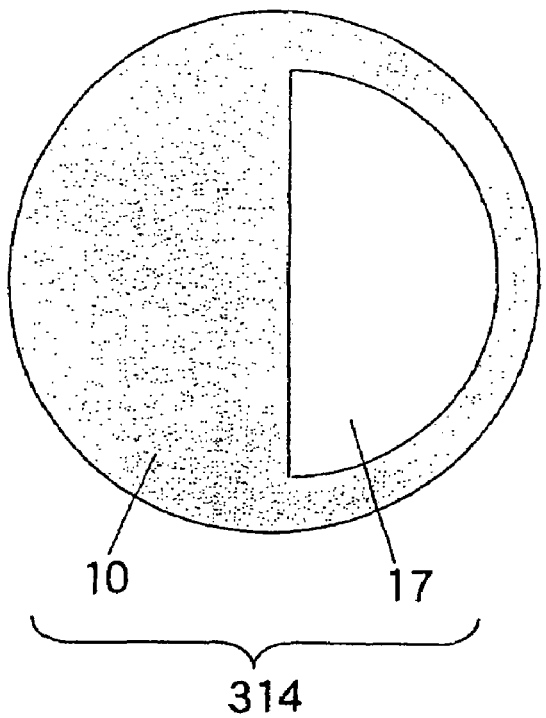

FIGS. 25A and 25B show in detail the structures of the focus detection pixels 313 and 314. As shown in FIG. 25A, the focus detection pixel 313 includes a micro-lens 10 and a single photoelectric conversion unit 16. As shown in FIG. 25B, the focus detection pixel 314 includes a micro-lens 10 and a single photoelectric conversion unit 17. The pair of photoelectric conversion unit 16 and 17 in the pair of focus detection pixels 313 and 314 are projected onto the exit pupil 90 of the exchangeable lens unit 202 via the micro-lenses 10 and form a pair of range-finding pupils 92 and 93, as shown in FIG. 13. Thus, a pair of image outputs to be used in focus detection can be obtained from the pair of focus detection pixels 313 and 314. By installing a single photoelectric conversion unit 16 (17) in each focus detection pixel 313 (314) as in the image sensor 211D shown in FIG. 24, the read circuit structure in the image sensor 211D can be simplified.

While the focus detection pixels 311 at the image sensor 211 shown in FIG. 7 are not equipped with color filters, the present invention may also be adopted in an image sensor with focus detection pixels equipped with color filters corresponding to one of the colors (e.g., green) assumed for the color filters mounted at the imaging pixels 310. In such a case, image data for the position occupied by each focus detection pixel 311, which would otherwise be occupied by a green pixel, can be obtained through interpolation processing executed as expressed in (25) instead of expression (10), further improving the accuracy with which the image data at the focus detection pixel 311, which would otherwise be occupied by a green pixel, are generated through interpolation.

$$S2(Y)=AF2\times Ks\times Kc \quad (25)$$

The image data at a focus detection pixel 311 that would otherwise be occupied by a blue pixel may be generated through interpolation as expressed in (26) below instead of expression (10).

$$S2(X)=AF3\times((Bau+Bad)/(Gau+Gad))\times Ks\times Kc \quad (26)$$

The focus detection pixels 311 in the image sensor 211 shown in FIG. 7 are not equipped with color filters. However, the present invention may also adopted in an image sensor that includes focus detection pixels equipped with color filters in colors matching the colors of the filters mounted at the imaging pixels 310 that would otherwise occupy the positions occupied by the focus detection pixels in the Bayer array. In such an image sensor, image shift detection will be executed in correspondence to each group of focus detection pixels 311 equipped with filters in the same color. As a result, the image interpolation accuracy will be further improved and an even higher quality image will be provided through the correction. The image data at each focus detection pixel 311, which would otherwise be occupied by a green pixel, can be calculated as expressed in (25), whereas the image data at each focus detection pixel 311, which would otherwise be occupied by a blue pixel, can be calculated as expressed in (27).

$$S2(X) = AF3 \times Ks \times Kc \tag{27}$$

While the corrected image data are saved into the memory card 213 in the operational flow shown in FIG. 16, the corrected image data may also be displayed on the electronic viewfinder or a rear monitor screen (not shown) installed at the rear side of the camera body.

While the information related to the characteristics of the image around the focus detection pixel row is obtained through calculation as expressed in (7), the range of the pixels to be used for the calculation is not limited to this example and the pixel range size may be adjusted as necessary. For instance, if an optical low pass filter with an intense filtering effect is mounted, the extent of image blur becomes significant and, accordingly, the range of the pixels used in the calculation expressed in (7) should be increased.

An example in which the image data at the focus detection pixel 311 that would otherwise be occupied by a green pixel are obtained by averaging the outputs from the four green pixels set on the diagonals around the focus detection pixel 311 is explained in reference to expression (8). However, this method gives rise to a problem in that if an edge pattern indicating a pixel output change along the direction in which the focus detection pixels 311 are arrayed is present over the focus detection pixel 311, a significant error manifests. Accordingly, if the relationship expressed in (28) below is satisfied, it may be judged that an edge pattern indicating a pixel output change along the focus detection pixel 311 arraying direction is present over the focus detection pixels 311 and the following processing may be executed. Namely, the image data for the position that would otherwise be occupied by a green pixel may be obtained by averaging the outputs from the green pixels present above and below the focus detection pixel 311, as expressed in (29) below.

$$|(G3+G6) - (G6+G7)| > T11 \tag{28}$$

T11 in expression (28) represents a predetermined threshold value.

$$S1(Y) = (G1+G9)/2 \tag{29}$$

It is to be noted that the image sensors 211, 211A, 211B, 211C and 211D may each be constituted with a CCD image sensor or a CMOS image sensor. In addition, while an explanation is given above in reference to the embodiment on an example in which the imaging device according to the present invention is a digital still camera 201 with the exchangeable lens unit 202 mounted at its camera body 203. However, the present invention may also be adopted in a digital still camera with an integrated lens or in a video camera, as well as in the digital still camera 201 in the embodiment. Furthermore, the present invention may be adopted in a compact camera module built into a portable telephone or the like, a surveillance camera or the like as well.

The imaging device in the embodiment includes an image sensor equipped with imaging pixels disposed in a two-dimensional array and focus detection pixels arrayed along a specific direction over part of the array of the imaging pixels. In the imaging device, an image pattern indicating a pixel output change along a direction perpendicular to the specific direction in which the focus detection pixels are arrayed is categorized based upon the outputs from imaging pixels present around each focus detection pixel. Then, an image output at the focus detection pixel is determined based upon the output from the focus detection pixel and the outputs from the imaging pixels present around the focus detection pixel by adopting a specific arithmetic operation method corresponding to the categorized image pattern. As a result, the output of the virtual imaging pixel corresponding to the position of the focus detection pixel can be accurately estimated. Thus, even when an edge pattern image or a fine line image pattern manifesting a change in the image along the direction perpendicular to the focus detection pixel row is superimposed over the focus detection pixel, the occurrence of color artifacts, false pattern or pattern loss can be prevented and the image quality can be kept at the desired level.

In the imaging device in an embodiment equipped with an image sensor that includes an array of imaging pixels and focus detection pixels, an image pattern indicating a pixel output change along the direction perpendicular to the direction in which the focus detection pixels are arrayed is categorized based upon the outputs from the imaging pixels. In addition, an image corresponding to the position occupied by each focus detection pixel is output based upon the outputs from the imaging pixels and also, an image corresponding to the position occupied by the focus detection pixel is output based upon the color structure of the outputs from the imaging pixels and the output from the focus detection pixel. Then, based upon the categorized image pattern and at least either of the images having been output, the image output at the focus detection pixel is determined. As a result, the output of the virtual imaging pixel corresponding to the position of the focus detection pixel can be even more accurately estimated. Thus, even when an edge pattern image or a fine line image pattern manifesting a change in the image along the direction perpendicular to the focus detection pixel row is superimposed over the focus detection pixel, the occurrence of color artifacts, false pattern or pattern loss can be prevented and the image quality can be kept at the desired level.

Alternatively, in the imaging device in an embodiment equipped with an image sensor that includes an array of imaging pixels and focus detection pixels, the difference between an image output along the direction perpendicular to the direction in which the focus detection pixels are arrayed is detected based upon the difference between the level of uniformity in the outputs from the imaging pixels present on the two sides of the focus detection pixel array and the average value of the outputs from the imaging pixels on the two sides of the focus detection pixel array. Then, based upon the detection results and the outputs from the imaging pixels, the image output at each focus detection pixel is determined. This method enables accurate categorization of the image pattern, which, in turn, makes it possible to accurately estimate the output from the virtual imaging pixel that would otherwise occupy the position occupied by the focus detection pixel.

Furthermore, in the imaging device in an embodiment equipped with an image sensor that includes an array of imaging pixels and focus detection pixels, the peak or the bottom among image outputs along the direction perpendicular to the direction in which the focus detection pixels are arrayed is detected based upon the outputs from the imaging pixels. Then, based upon the detection results and the outputs from the imaging pixels, the image output at the focus detection pixel is determined. This method enables accurate categorization of the image pattern, which, in turn, makes it possible to even more accurately estimate the output from the virtual imaging pixel that would otherwise occupy the position occupied by the focus detection pixel.

What is claimed is:

1. An imaging device, comprising:
an image sensor that includes imaging pixels, which generate image outputs, disposed in a two-dimensional array and focus detection pixels, which generate outputs for focus detection, disposed along a specific direction over part of the array of the imaging pixels;
a recognizing circuit that recognizes an image pattern indicating a pixel image output change of the imaging pixels along a direction perpendicular to the specific direction in which the focus detection pixels are disposed using the image outputs from the imaging pixels present around each focus detection pixel; and
a determining circuit that determines an image output for an interpolation at each focus detection pixel using an output from the focus detection pixel and the image outputs from the imaging pixels present around the focus detection pixel through a first arithmetic operation method if the image pattern has been recognized by the recognizing circuit and using the image outputs from the imaging pixels present around the focus detection pixel without the output from the focus detection pixel through a second arithmetic operation method if the image pattern has not been recognized by the recognizing circuit.

2. An imaging device according to claim 1, wherein:
the image sensor includes a plurality of pixel units disposed in a two-dimensional array, each equipped with a plurality of types of imaging pixels with different spectral sensitivity characteristics set regularly, and also includes focus detection pixels with sensitivity over a range encompassing the spectral sensitivity characteristics of the pixel units, which are disposed within the array of the imaging pixels.

3. An imaging device according to claim 2, wherein:
the pixel units each include three different types of pixels disposed in a Bayer array with sensitivity to red, green and blue.

4. An imaging device according to claim 3, wherein:
the focus detection pixels are disposed on the image sensor at positions equivalent to a horizontal row or a vertical row along which the imaging pixels sensitive to blue and green would otherwise be disposed in a straight line.

5. An imaging device according to claim 1, wherein:
the imaging pixels and the focus detection pixels each include a micro-lens and a photoelectric conversion unit.

6. An imaging device according to claim 1, wherein:
the focus detection pixels detect a pair of images formed with a pair of light fluxes passing through a pair of areas at an exit pupil of the imaging optical system.

7. A camera equipped with an imaging device according to claim 1.

8. An imaging device, comprising:
an image sensor that includes an array of imaging pixels, which generate image outputs, and focus detection pixels, which generate outputs for focus detection;
a recognizing circuit that recognizes an image pattern indicating a pixel image output change of the imaging pixels along a direction perpendicular to a direction in which the focus detection pixels are disposed using the image outputs from the imaging pixels present around each focus detection pixel;
a first circuit that outputs a first pixel image output using a color structure of the image outputs from the imaging pixels present around the focus detection pixel and an output from the focus detection pixel;
a second circuit that outputs a second pixel image output using the image outputs from the imaging pixels present around the focus detection pixel without the output from the focus detection pixel;
a determining circuit that determines an image output for an interpolation at each focus detection pixel using the second pixel image output without the first pixel image output if the image pattern has not been recognized by the recognizing circuit and using at least the first pixel image output if the image pattern has been recognized by the recognizing circuit.

9. An imaging device according to claim 8, wherein:
the determining circuit determines the image output at each focus detection pixel by individually weighting the first pixel image output and the second pixel image output in correspondence to the image pattern having been recognized by the recognizing circuit.

10. An imaging device, comprising:
an image sensor that includes an array of imaging pixels, which generate image outputs, and focus detection pixels, which generate outputs for focus detection;
a recognizing circuit that recognizes image uniformity along a direction perpendicular to a direction in which the focus detection pixels are disposed using a predetermined threshold condition of the image outputs from the imaging pixels, the image uniformity being an extent of a pixel image output change of the imaging pixels present around each focus detection pixel that is less than a predetermined threshold value; and
a determining circuit that determines an image output for an interpolation at each focus detection pixel using an output from the focus detection pixel and the image outputs from the imaging pixels present around the focus detection pixel through a first arithmetic operation method if the image uniformity has been recognized by the recognizing circuit and using the image outputs from the imaging pixels present around the focus detection pixel without the output from the focus detection pixel through a second arithmetic operation method if the image uniformity has not been recognized.

11. An imaging device, comprising:
an image sensor that includes an array of imaging pixels, which generate image outputs, and focus detection pixels, which generate outputs for focus detection;
a detection circuit that detects a difference among the image outputs along a direction perpendicular to a direction in which the focus detection pixels are disposed using a predetermined threshold condition of the image outputs from the imaging pixels present around each focus detection pixel, the difference among image outputs being an extent of a pixel image output change of the imaging pixels present around each focus detection pixel that is more than a predetermined threshold value; and
a determining circuit that determines an image output for an interpolation at each focus detection pixel using an output from the focus detection pixel and the image outputs from the imaging pixels present around the focus detection pixel through a first arithmetic operation method if the difference among image outputs has been detected by the detection circuit and using the image outputs from the imaging pixels present around the focus detection pixel without the output from the focus detection pixel through a second arithmetic operation method if the difference among image outputs has not been detected.

12. An imaging device, comprising:
an image sensor that includes an array of imaging pixels, which generate image outputs, and focus detection pixels, which generate outputs for focus detection;
a detection circuit that detects a difference among the image outputs along a direction perpendicular to a direction in which the focus detection pixels are disposed using a predetermined threshold condition of uniformity among the image outputs from the imaging pixels present on two sides of the array of the focus detection pixels and a predetermined threshold condition of a difference between average values of the image outputs from the imaging pixels present on the two sides of the array of focus detection pixels, the difference among image outputs being an extent of a pixel image output change of the imaging pixels present on the two sides of the array of focus detection pixel that is more than a predetermined threshold value; and
a determining circuit that determines an image output for an interpolation at each focus detection pixel using an output from the focus detection pixel and the image outputs from the imaging pixels present around the focus detection pixel through a first arithmetic operation method if the difference among image outputs has been detected by the detection circuit and using the image outputs from the imaging pixels present around the focus detection pixel without the output from the focus detection pixel through a second arithmetic operation method if the difference among image outputs has not been detected.

13. An imaging device, comprising:
an image sensor that includes an array of imaging pixels, which generate image outputs, and focus detection pixels, which generate outputs for focus detection;
a detection circuit that detects a peak or a bottom among the image outputs along a direction perpendicular to a direction in which the focus detection pixels are disposed using a predetermined threshold condition of the image outputs from the imaging pixels present around each focus detection pixel and from each focus detection pixel, the peak or the bottom being an extent of a pixel image output change using each focus detection pixel and the imaging pixels present around the each focus detection pixel that is more than a predetermined threshold value; and
a determining circuit that determines an image output for an interpolation at each focus detection pixel using an output from the focus detection pixel and the image outputs from the imaging pixels present around the focus detection pixel through a first arithmetic operation method if the peak or the bottom has been detected by the detection circuit and using the image outputs from the imaging pixels present around the focus detection pixel without the output from the focus detection pixel through a second arithmetic operation method if the peak or the bottom has not been detected.

14. An imaging device, comprising:
an image sensor that includes an array of imaging pixels, which generate image outputs, and focus detection pixels, which generate outputs for focus detection;
a detection circuit that detects a peak or a bottom among the image outputs along a direction perpendicular to a direction in which the focus detection pixels are disposed using a predetermined threshold condition of uniformity among the image outputs from the imaging pixels present on two sides of the array of the focus detection pixels and a predetermined threshold condition of a difference between an average value of the image outputs from the imaging pixels present on the two sides of the array of the focus detection pixels and image data corresponding to each focus detection pixel in the array of the focus detection pixels, the peak or the bottom being an extent of a pixel image output change using each focus detection pixel and the imaging pixels present on the two sides of the array of the focus detection pixels that is more than a predetermined threshold value; and
a determining circuit that determines an image output for an interpolation at each focus detection pixel using an output from the focus detection pixel and the image outputs from the imaging pixels present on the two sides of the array of the focus detection pixels through a first arithmetic operation method if the peak or the bottom has been detected by the detection circuit and using the image outputs from the imaging pixels present on the two sides of the array of the focus detection pixels without the output from the focus detection pixel through a second arithmetic operation method if the peak or the bottom has not been detected.

15. An image processing method, comprising:
providing an image sensor that includes imaging pixels, which generate image outputs, disposed in a two-dimensional array and focus detection pixels, which generate outputs for focus detection, disposed along a specific direction over part of the array of the imaging pixels;
recognizing an image pattern indicating a pixel image output change along a direction perpendicular to the specific direction in which the focus detection pixels are disposed using the image outputs from the imaging pixels present around each focus detection pixel; and
determining an image output at the focus detection pixel for an interpolation using an output from the focus detection pixel and the image outputs from the imaging pixels present around the focus detection pixel through a first arithmetic operation method if the image pattern has been recognized and using the image outputs from the imaging pixels present around the focus detection pixel without the output from the focus detection pixel through a second arithmetic operation method if the image pattern has not been recognized.

16. An image processing method, comprising:
providing an image sensor that includes an array of imaging pixels, which generate image outputs, and focus detection pixels, which generate outputs for focus detection;
recognizing an image pattern indicating a pixel image output change of the imaging pixels along a direction perpendicular to a direction in which the focus detection pixels are disposed using image outputs from the imaging pixels present around each focus detection pixel;
executing first processing to output a first pixel image output using the image outputs from the imaging pixels present around the focus detection pixel without an output from the focus detection pixel;

executing second processing to output a second pixel image output using a color structure of the image outputs from the imaging pixels present around the focus detection pixel and the output from the focus detection pixel; and determining an image output for an interpolation at each focus detection pixel using the first pixel image output without the second pixel image output if the image pattern has not been recognized and using at least the second pixel image output if the image pattern has been recognized.

* * * * *